(12) United States Patent
Ishimoto et al.

(10) Patent No.: US 8,646,741 B2
(45) Date of Patent: Feb. 11, 2014

(54) VEHICLE SEAT

(75) Inventors: Manabu Ishimoto, Chiryu (JP); Keisuke Ishizaki, Nishio (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/394,611

(22) PCT Filed: Sep. 10, 2009

(86) PCT No.: PCT/JP2009/065874
§ 371 (c)(1),
(2), (4) Date: Mar. 7, 2012

(87) PCT Pub. No.: WO2011/030434
PCT Pub. Date: Mar. 17, 2011

(65) Prior Publication Data
US 2012/0168596 A1    Jul. 5, 2012

(51) Int. Cl.
*F16M 13/00*  (2006.01)
(52) U.S. Cl.
USPC ........................................ 248/429; 296/65.13
(58) Field of Classification Search
USPC .......... 248/424, 429, 430; 297/344.1, 344.11; 296/65.01, 65.13
See application file for complete search history.

(56) References Cited

U.S. PATENT DOCUMENTS 8,393,591 B2 * 3/2013 Mizuno et al. ................ 248/424
8,464,993 B2 * 6/2013 Muraishi ....................... 248/429
2005/0285007 A1 * 12/2005 Tanaka ........................... 248/429
2006/0131470 A1    6/2006 Yamada et al.
2010/0207419 A1 * 8/2010 Kojima et al. ............. 296/65.13

FOREIGN PATENT DOCUMENTS

| JP | 4-86527 | 7/1992 |
| JP | 6-270725 | 9/1994 |
| JP | 11-78627 | 3/1999 |

(Continued)

OTHER PUBLICATIONS

International Search Report in International Application No. PCT/JP2009/065874, filed Sep. 10, 2009; Mailing Date: Dec. 8, 2009.

(Continued)

*Primary Examiner* — Todd M. Epps
(74) *Attorney, Agent, or Firm* — Finnegan, Henderson, Farabow, Garrett & Dunner, LLP

(57) ABSTRACT

A vehicle seat configured in such a manner that vibration occurring in the seat body can be suppressed without adding a special device such as a dynamic damper. A vehicle seat is configured in such a manner that an upper rail (26) connected to the seat body is slidably supported by a lower rail (28), which is affixed to the vehicle body side, through a pair of slide guides (42, 44) disposed next to each other in the front-rear direction of the seat. The distance (L) between the slide guides (42, 44) is set to be less than the half of the maximum slide amount (S) of the upper rail (26) relative to the lower rail (28). As a result of the configuration, the rigidity of support of the seat body by the vehicle body is reduced to reduce the resonance frequency of the seat body in the front-rear direction. This enables the resonance frequency of the seat body in the front-rear direction to be shifted from the resonance frequency of the vehicle body when the engine of the vehicle is idling.

10 Claims, 33 Drawing Sheets

(56) References Cited

FOREIGN PATENT DOCUMENTS

| | | |
|---|---|---|
| JP | 2001-63409 | 3/2001 |
| JP | 2006-168688 | 6/2006 |
| JP | 2006-298353 | 11/2006 |

OTHER PUBLICATIONS

English-language Translation of Applicant's Response to Written Opinion in International Application No. PCT/JP2009/065874, filed Sep. 10, 2009.

* cited by examiner

FIG.16

| | RAIL FRONT-REAR LENGTH | GUIDE SEPARATION | NV PERFORMANCE | WEIGHT | MAXIMUM SLIDE AMOUNT | REAR SEAT COMFORT |
|---|---|---|---|---|---|---|
| FIG. 11 (RELATED) | NORMAL | NORMAL | △ | △ | △ | △ |
| FIG. 12 (RELATED) | NORMAL | SHORT | ○ | △ | × | △ |
| FIG. 13 (RELATED) | LONG | NORMAL | △ | × | ○ | × |
| FIG. 14 (RELATED) | SHORT | NORMAL | △ | △ | × | △ |
| FIG. 8 (PRESENT INVENTION) | NORMAL | SHORT | ○ | △ | ○ | △ |
| FIG. 15 (PRESENT INVENTION) | SHORT | SHORT | △ | ○ | △ | ○ |

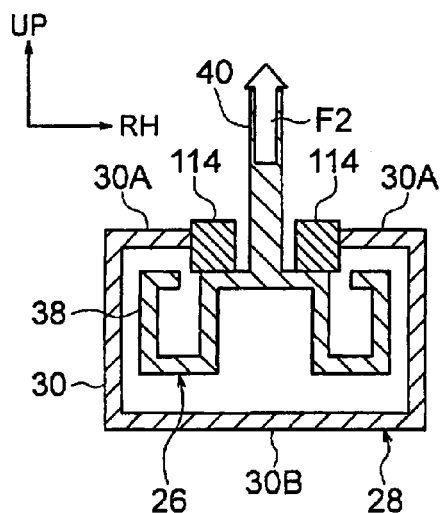
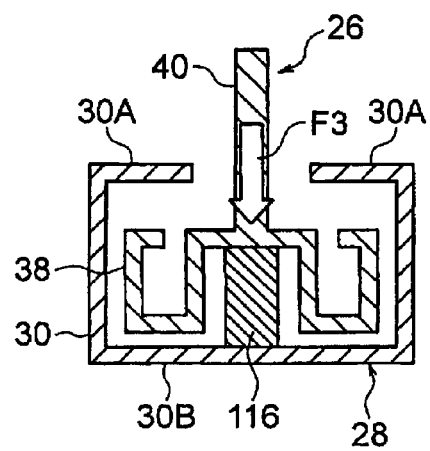
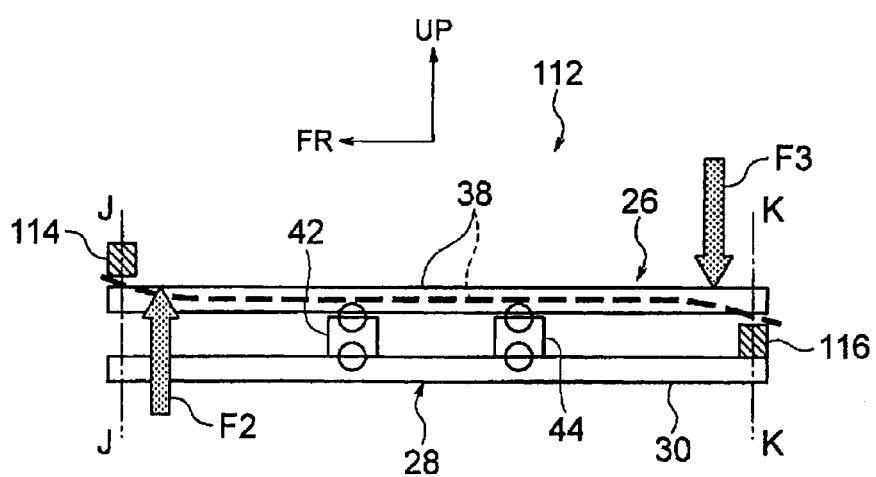

VEHICLE SEAT

CROSS-REFERENCE TO RELATED APPLICATIONS

This application is a national phase application of International Application No. PCT/JP2009/065874, filed Sep. 10, 2009, the contents of which are incorporated herein by reference.

TECHNICAL FIELD

The present invention relates to a vehicle seat in which an upper rail connected to a seat body supported so as to be capable of sliding with respect to a lower rail fixed to the vehicle body side through a pair of slide guides.

BACKGROUND ART

Related technology is known for suppressing vibration from occurring in a vehicle seat, using a technique of fixing a dynamic damper to the vehicle seat (see for example Japanese Patent Application Laid-Open (JP-A) No. 2006-298353).

DISCLOSURE OF INVENTION

Technical Problem

However, due to such a dynamic damper being both large and complicated, problems arise such as the difficulty in securing a mounting base for attaching to the vehicle seat, and increased manufacturing cost and weight of the vehicle seat.

In consideration of the above circumstances, an object of the present invention is a vehicle seat capable of suppressing vibration from occurring in a seat body without adding an separate device such as a dynamic damper.

Solution to Problem

A first aspect of the present invention provides a vehicle seat supported such that an upper rail connected to a seat body is capable of sliding in a seat front-rear direction relative to a lower rail fixed at the vehicle body side through a pair of slide guides disposed in a row along the seat front-rear direction, wherein: the separation between the seat front-rear direction central portion of a first of the slide guides and the seat front-rear direction central portion of the second of the slide guides is narrower than half the maximum slide amount of the upper rail with respect to the lower rail; at least one of the upper rail and/or the lower rail includes projection portion(s) projecting out towards the opposing rail side in the vehicle up-down direction at the front end portion or the rear end portion or both the front and rear end portions; a gap is provided between the leading end of the projection portion(s) and the opposing rail such that the gap has a smaller up-down direction dimension than the up-down direction dimension of the projection portion(s); and the leading end of the projection portion(s) suppress bowing by making contact with the opposing rail when the upper rail bows towards the lower rail side due to load applied from the seat body side.

In the vehicle seat of the first aspect the separation between the front and rear pair of the slide guides is made as narrow as a specific value or narrower. The supporting rigidity of the seat body with respect to the vehicle body is accordingly lowered, lowering the seat body front-rear direction resonance frequency. The seat body front-rear direction resonance frequency can accordingly be shifted from a resonance frequency of the vehicle body, such as the resonance frequency of the vehicle during engine idling. Vibration of the seat body can hence be suppressed from occurring without providing an additional separate device such as a dynamic damper. Due also to the narrowed separation between the pair of slide guides, sometimes the front end portion or the rear end portion or both the front and rear end portions of the upper rail bow towards the lower rail side when overload is input from the seat body side to the upper rail due for example to a vehicle collision. In such a case the projection portion(s) provided to the front end portion or the rear end portion or both the front and rear end portions of at least one of the upper rail and/or the lower rail suppress the bowing described above by making contact with the opposing rail in the vehicle up-down direction (the lower rail or the upper rail). Consequently, seat rigidity performance during input of a large load can be secured while still suppressing vibration of the seat body in normal circumstances.

A vehicle seat of a second aspect of the present invention is the vehicle seat of the first aspect wherein: the upper rail includes a front upper projection portion and a rear upper projection portion disposed further to the seat rear side than the front upper projection portion; the lower rail includes a front lower projection portion and a rear lower projection portion disposed further to the seat rear side than the front lower projection portion; each of the pair of slide guides includes a guide body and a ball rotatably attached to the guide body; the guide body of the first slide guide, which is disposed at the center between the rear upper projection portion and the front upper projection portion in a state in which the upper rail is disposed at the center of its sliding range with respect to the lower rail, restricts the upper rail from sliding towards the seat front side with respect to the lower rail by the guide body of the first slide guide being sandwiched between the rear upper projection portion and the front lower projection portion; and the guide body of the second slide guide, which is disposed at the center between the front upper projection portion and the rear lower projection portion in a state in which the upper rail is disposed at the center of the sliding range with respect to the lower rail, restricts the upper rail from sliding towards the seat rear side with respect to the lower rail by the guide body of the second slide guide being sandwiched between the front upper projection portion and the rear lower projection portion.

In the vehicle seat of the second aspect, when the upper rail slides with respect to the lower rail towards the seat front side, the first slide guide is sandwiched between the rear upper projection portion provided to the upper rail and the front lower projection portion provided to the lower rail. The upper rail is thereby restricted from sliding with respect to the lower rail towards the seat front side.

The rear upper projection portion of the upper rail here is disposed further towards the seat rear side than the front upper projection portion of the upper rail, and the front lower projection portion of the lower rail is disposed further towards the seat front side than the rear lower projection portion of the lower rail. The separation distance between the rear upper projection portion and the front lower projection portion can accordingly be set large in the state in which the upper rail is disposed at the center of its sliding range with respect to the lower rail. A large siding amount can accordingly be set for the upper rail from the central disposed state referred to above towards the seat front side (the siding amount of the upper rail until the first slide guide is sandwiched between the rear upper projection portion and the front lower projection portion).

When the upper rail slides with respect to the lower rail towards the seat rear side, the second slide guide is sandwiched between the front upper projection portion provided to the upper rail and the rear lower projection portion provided to the lower rail. The upper rail is accordingly restricted from sliding with respect to the lower rail towards the seat rear side.

The front upper projection portion of the upper rail is disposed here further towards the seat front side than the rear upper projection portion of the upper rail, and the rear lower projection portion of the lower rail is disposed further to the seat rear side than the front lower projection portion of the lower rail. The separation distance between the front upper projection portion and the rear lower projection portion can accordingly be set large in the state in which the upper rail is disposed at the center of its sliding range with respect to the lower rail. A large siding amount can accordingly be set for the upper rail from the central disposed state referred to above towards the seat rear side (the siding amount of the upper rail until the second slide guide is sandwiched between the front upper projection portion and the rear lower projection portion).

Consequently, in the vehicle seat the maximum siding amount of the upper rail with respect to the lower rail can be set larger than the overall length of the upper rail and the lower rail.

A vehicle seat of a third aspect of the present invention is the vehicle seat of the second aspect wherein: a first side contact portion that makes contact with the rear upper projection portion and the front lower projection portion is provided to the guide body of the first slide guide, and a second side contact portion that makes contact with the front upper projection portion and the rear lower projection portion is provided to the second slide guide; the rear upper projection portion, the front lower projection portion and the first side contact portion are disposed further to a first side in the seat left-right direction than seat left-right direction central portions of the upper rail and the lower rail; and the front upper projection portion, the rear lower projection portion and the second side contact portion are disposed further to the second side in the seat left-right direction than seat left-right direction central portions of the upper rail and the lower rail.

In the vehicle seat of the third aspect, when the upper rail slides towards the seat rear side with respect to the lower rail, the first side contact portion provided to the first slide guide makes contact with the rear upper projection portion of the upper rail and the front lower projection portion of the lower rail. The first slide guide is accordingly sandwiched between the rear upper projection portion and the front lower projection portion. When the upper rail slides with respect to the lower rail towards the seat rear side, the second side contact portion provided to the second slide guide makes contact with the front upper projection portion of the upper rail and the rear lower projection portion of the lower rail. The second slide guide is accordingly sandwiched between the front upper projection portion and the rear lower projection portion.

In such a vehicle seat, the rear upper projection portion, the front lower projection portion, and the first side contact portion are disposed further to a first side in the seat left-right direction than seat left-right direction central portions of the upper rail and the lower rail. The front upper projection portion, the rear lower projection portion and the second side contact portion are disposed further to the second side in the seat left-right direction than seat left-right direction central portions of the upper rail and the lower rail. Accordingly, a simple structure is achieved that enables unwanted interference of the rear upper projection portion with respect to the rear lower projection portion and the second side contact portion, and unwanted interference of the front upper projection portion with the front lower projection portion and the first side contact portion to be avoided.

A vehicle seat of a fourth aspect of the present invention is the vehicle seat of the second aspect or the third aspect wherein: the front lower projection portion is provided to a front end portion of the lower rail, the rear lower projection portion is provided to a rear end portion of the lower rail, and the upper rail is restricted from sliding towards the seat front side with respect to the lower rail by the guide body of the slide guide at the seat front side being sandwiched between the rear upper projection portion and the front lower projection portion; and the upper rail is restricted from sliding towards the seat rear side with respect to the lower rail by the guide body of the slide guide on the seat rear side being sandwiched between the front upper projection portion and the rear lower projection portion.

In the vehicle seat of the fourth aspect, the front lower projection portion is provided to the front end portion of the lower rail, and the rear lower projection portion is provided to the rear end portion of the lower rail. Accordingly, the front lower projection portion and the rear lower projection portion can be configured as a common component as a detachment prevention stopper for preventing detachment of the slide guides from the front-rear direction end portions of the lower rail.

A vehicle seat of a sixth aspect of the present invention is the vehicle seat of any one of the first to the fourth aspects wherein: the lower rail includes a top wall whose bottom face faces towards the top face of the upper rail and a bottom wall whose top face faces towards the bottom face of the upper rail; the projection portion(s) are provided to at least one of the top face side of the front end portion of the upper rail and/or the bottom face side of the front end portion of the top wall; and the projection portion(s) are provided to at least one of the bottom face side of the rear end portion of the upper rail and/or the top face side of the rear end portion of the bottom wall.

In the vehicle seat of the sixth aspect, when the vehicle is involved in a collision from behind, the front end portion side of the upper rail bows upwards due to load input from the seat body, and the projection portion(s) provided to at least one of the top face side of the upper rail front end portion and/or the bottom face side of the lower rail top wall front end portion make(s) contact with the bottom face of the top wall of the lower rail or the top face of the upper rail. Bowing of the upper rail front end portion side is accordingly suppressed.

In such a situation, when the upper rail rear end portion side bows downwards due to load input from the seat body, the projection portion(s) provided to at least one of the bottom face side of the upper rail rear end portion and/or the top face side of the bottom wall rear end portion of the lower rail make(s) contact with the top face of the bottom wall of the lower rail or the bottom face of the upper rail. Bowing of the lower rail rear end portion side is accordingly suppressed. The seat rigidity performance when a vehicle is involved in a collision from behind can accordingly be secured.

Note that bowing of the upper rail can be suppressed irrespective of the sliding state of the upper rail with respect to the lower rail when projection portions are provided to both the top face side of the upper rail front end portion and the bottom face side of the top wall front end portion of the lower rail and to the bottom face side of the upper rail rear end portion and the top face of the bottom wall rear end portion of the lower rail.

A vehicle seat of a seventh aspect of the present invention is the vehicle seat of any one of the first to the fourth aspects wherein: the lower rail includes a top wall whose bottom face faces towards the top face of the upper rail and a bottom wall whose top face faces towards the bottom face of the upper rail; the projection portion(s) are provided to at least one of the bottom face side of the front end portion of the upper rail and/or the top face side of the front end portion of the bottom wall; and the projection portion(s) are provided to at least one of the top face side of the rear end portion of the upper rail and/or the bottom face side of the rear end portion of the top wall.

In the vehicle seat of the seventh aspect, when the front end portion side of the upper rail bows downwards due to load input from the seat body when the vehicle is involved in a frontal collision, the projection portion(s) provided to at least one of the bottom face side of the upper rail front end portion and/or the top face side of the bottom wall front end portion of the lower rail make contact with the top face of the bottom wall of the lower rail or the bottom face of the upper rail. Bowing of the upper rail front end portion side is accordingly suppressed.

In such a situation, when the rear end portion side of the upper rail bows upwards due to load input from the seat body, the projection portion(s) provided to at least one of the top face side of the upper rail rear end portion or the bottom face side of the top wall rear end portion of the lower rail make(s) contact with the bottom face of the top wall of the lower rail or the top face of the upper rail. Bowing of the lower rail rear end portion side is accordingly suppressed. Consequently, seat rigidity performance when the vehicle is involved in a frontal collision can be secured.

Note that bowing of the upper rail can be suppressed irrespective of the sliding state of the upper rail with respect to the lower rail when projection portions are provided to both the bottom face side of the upper rail front end portion and the top face side of the bottom wall front end portion of the lower rail and to both the top face side of the upper rail rear end portion and the bottom face side of the top wall rear end portion of the lower rail.

A vehicle seat of an eighth aspect of the present invention is the vehicle seat of any one of the first to the fourth aspects wherein: the seat left-right direction end sides of the bottom face of the upper rail are disposed closer to the lower rail than the seat left-right direction central portion of the bottom face of the upper rail; and the projection portion(s) are provided between the seat left-right direction end sides of the bottom face of the upper rail and the lower rail.

In the vehicle seat of the eighth aspect, the seat left-right direction end sides of the bottom face of the upper rail are disposed closer to the lower rail than the seat left-right direction central portion of the bottom face of the upper rail and projection portions are provided between the end sides and the lower rail. The height dimension of the projection portions can accordingly be made lower, enabling more compact and lighter projection portions to be achieved.

A vehicle seat of a ninth aspect of the present invention is the vehicle seat of any one of the first to the fourth aspects wherein: the lower rail includes a rail body and bracket(s) for connecting the seat front-rear direction end portions of the rail body to the vehicle body; and the projection portion(s) are provided to the bracket(s).

In the vehicle seat of the ninth aspect, due to providing the projection portions to the bracket for connecting the rail body of the lower rail to the vehicle body, the upper rail contacting the projection portion when a large load is input to the seat body can directly be supported by the vehicle body side rather than by transmission through the rail body. Consequently, good seat rigidity performance can be secured when a large load is input.

A vehicle seat of a tenth aspect of the present invention is the vehicle seat of any one of the first to the fourth aspects wherein the projection portion projects from the upper rail in the vicinity of below a connection portion to the seat body towards the lower rail side. In the vehicle seat of the tenth aspect, when the upper rail bows towards the lower rail side due to load input from the seat body side, such as when a vehicle is involved in a collision, the projection portion provided to the upper rail makes contact with the lower rail. Bowing of the upper rail is accordingly suppressed. Consequently seat rigidity performance when the vehicle is involved in a collision from behind can be secured. However, since the projection portion that makes contact with the lower rail is provided to the upper rail in the vicinity of below a connection portion to the seat body, the connection portion to the seat body can be directly supported without being influenced by bowing of the upper rail. Consequently, good supporting rigidity of the seat body can be achieved by the projection portion. A vehicle seat of an eleventh aspect of the present invention is the vehicle seat of any one of the first to the tenth aspects wherein a bent portion is provided to the projection portion. A vehicle seat of a twelfth aspect of the present invention is the vehicle seat of the eleventh aspect wherein a gap is provided between at least one of the upper rail and the lower rail and the projection portion(s).

Advantageous Effects of Invention

As explained above, in the vehicle seat according to the first aspect of the present invention, vibration of the seat body can be suppressed from occurring without providing an additional separate device such as a dynamic damper.

In the vehicle seat according to the second aspect of the present invention, the maximum siding amount of the upper rail with respect to the lower rail can be set larger than the length dimension of components such as the upper rail.

In the vehicle seat according to the third aspect of the present invention, a simple structure is achieved that enables unwanted interference of the rear upper projection portion with respect to the rear lower projection portion and the second side contact portion, and unwanted interference of the front upper projection portion with the front lower projection portion and the first side contact portion to be avoided.

In the vehicle seat according to the fourth aspect of the present invention, the front lower projection portion and the rear lower projection portion can be configured as a common component as a detachment prevention stopper for preventing detachment of the slide guides from the front-rear direction end portions of the lower rail.

In the vehicle seat according to the fifth aspect of the present invention, seat rigidity performance can be secured during input of a large load while still suppressing vibration of the seat body in normal circumstances.

In the vehicle seat according to the sixth aspect of the present invention, seat rigidity performance when the vehicle is involved in a collision from behind can be secured.

In the vehicle seat according to the seventh aspect of the present invention, seat rigidity performance when the vehicle is involved in a frontal collision can be secured.

In the vehicle seat according to the eighth aspect of the present invention, the projection portion(s) can be configured so as to be both compact and light weight.

In the vehicle seat according to the ninth aspect of the present invention, good seat rigidity performance can be secured when a large load is input.

In the vehicle seat according to the tenth aspect of the present invention, good supporting rigidity of the seat body can be achieved by the projection portion.

BRIEF DESCRIPTION OF DRAWINGS

FIG. 16 is a table comparing slide rails according to the first exemplary embodiment of the present invention and related slide rails.

FIG. 25A is vertical cross-section corresponding to FIG. 23A, illustrating a state in which the top face of the upper rail has made contact with projection portions on the lower rail front end portion, and FIG. 25B is a vertical cross-section corresponding to FIG. 23B, illustrating a state in which the bottom face of the upper rail has made contact with a projection portion of the lower rail rear end portion.

FIG. 26 is a schematic diagram for explaining a state in which the upper rail of the slide rail illustrated in FIG. 23 has bowed.

DESCRIPTION OF EMBODIMENTS

First Exemplary Embodiment

Figure 1:
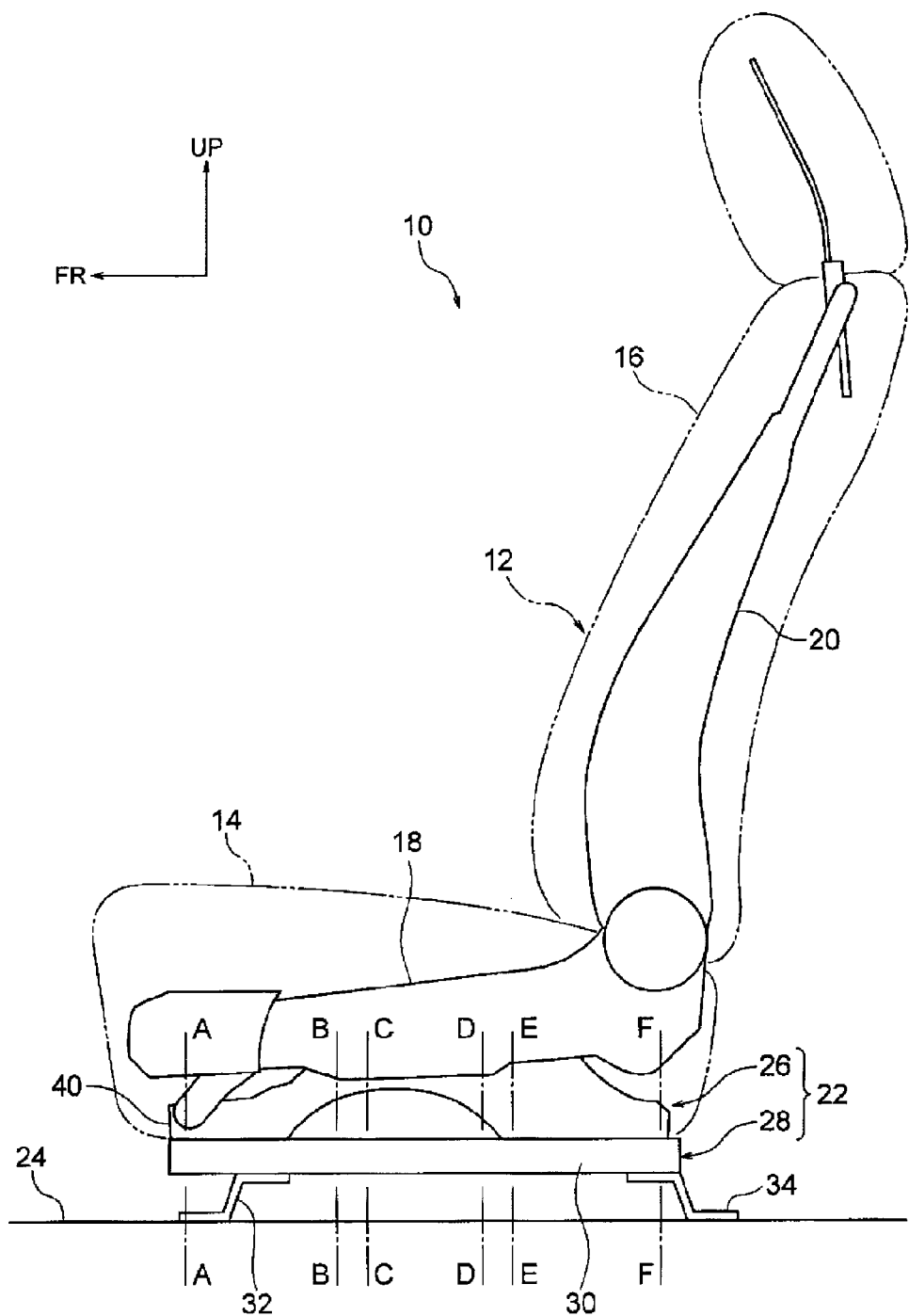
FIG. 1 is a schematic side view illustrating a configuration of relevant portions of a vehicle seat according to a first exemplary embodiment of the present invention.

Explanation follows regarding a vehicle seat 10 according to a first exemplary embodiment of the present invention, with reference to FIG. 1 to FIG. 21. In the drawings arrow UP indicates the top direction of the vehicle seat 10, arrow FR indicates the front direction of the vehicle seat 10, and arrow RH indicates the vehicle seat right hand side direction.

Figure 2:
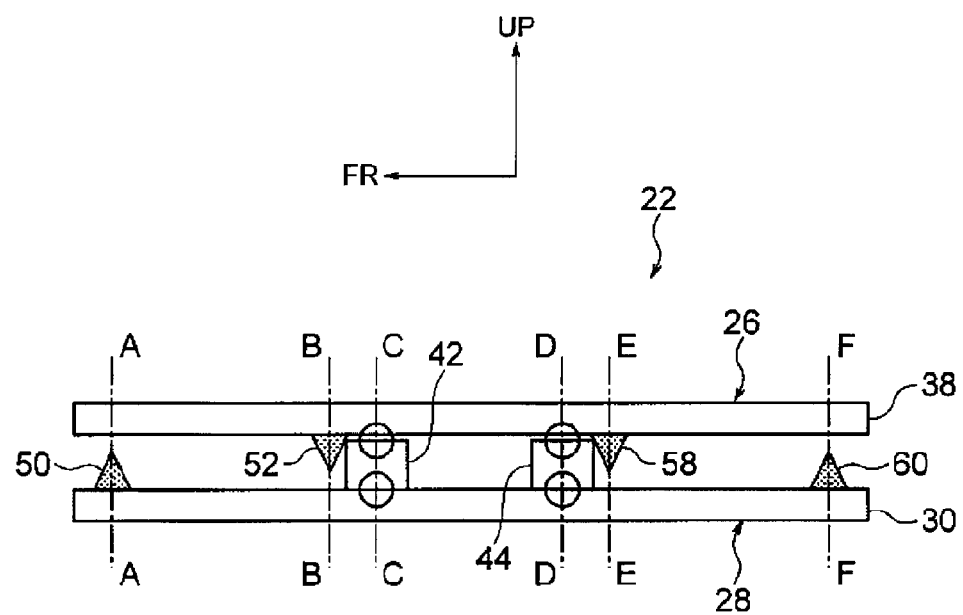
FIG. 2 is a schematic diagram of a slide rail that is a configuration member of the vehicle seat illustrated in FIG. 1.
Figure 3A:
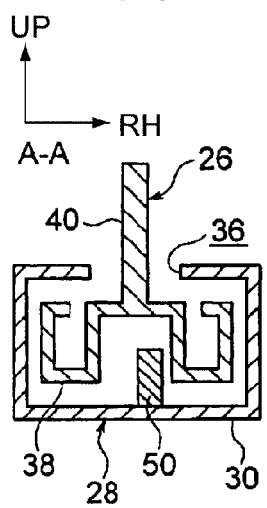
FIGS. 3A to 3F are vertical cross-sections, with FIG. 3A corresponding to a vertical cross-section taken on line A-A of FIG. 1, FIG. 3B corresponding to a vertical cross-section taken on line B-B of FIG. 1, FIG. 3C corresponding to a vertical cross-section taken on line C-C of FIG. 1, FIG. 3D corresponding to a vertical cross-section taken on line D-D of FIG. 1, FIG. 3E corresponding to a vertical cross-section taken on line E-E of FIG. 1, and FIG. 3F corresponding to a vertical cross-section taken on line F-F.
Figure 3B:
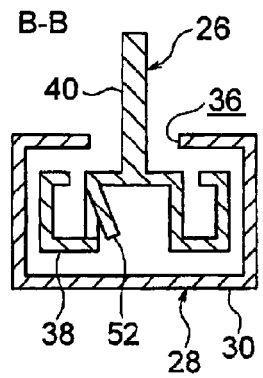
Figure 3C:
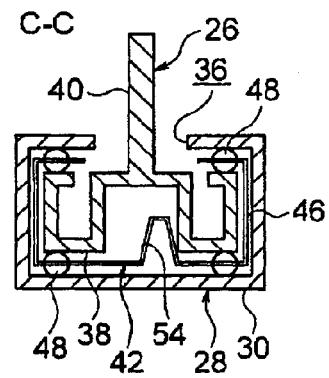
Figure 3D:
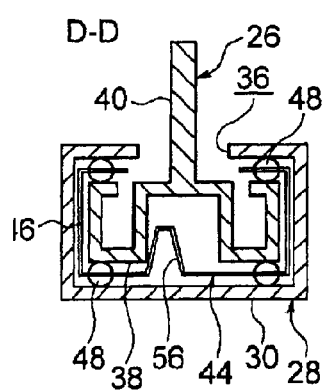
Figure 3E:
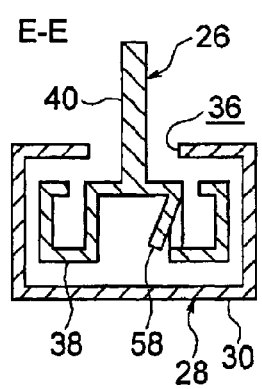
Figure 3F:
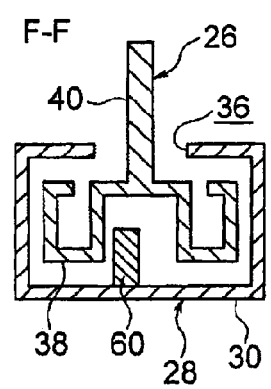
Figure 4:
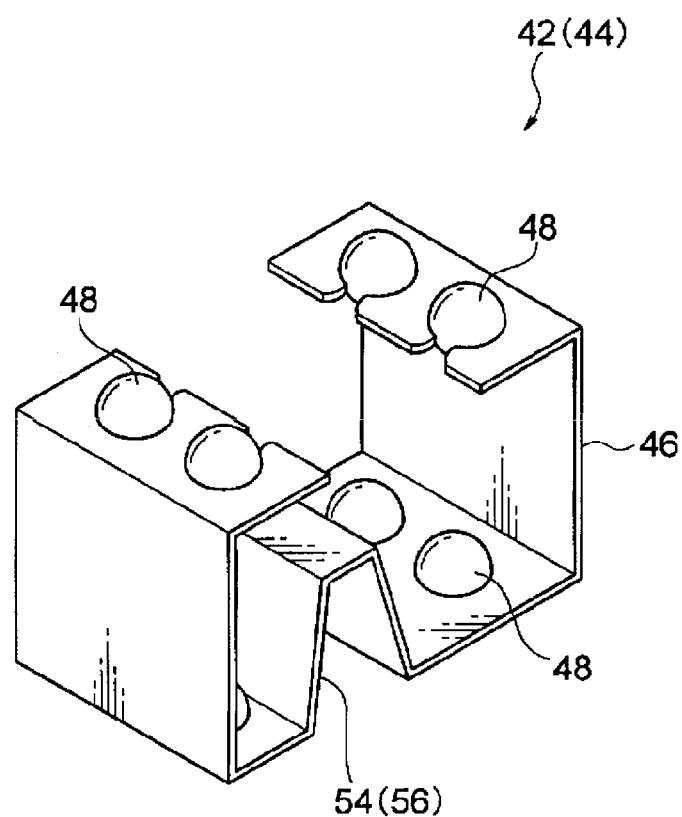
FIG. 4 is a perspective view of a slide guide that is a configuration member of the slide rail illustrated in FIG. 1.

As shown in FIG. 1, the vehicle seat 10 according to the first exemplary embodiment is equipped with a seat body 12. The seat body 12 includes a seat cushion 14 for supporting the bottom of a seated occupant and a seat back 16 for supporting the back region of the seated occupant. The seat cushion 14 includes a frame member of a seat cushion frame 18, and a seat back frame 20, which is a frame member of the seat back 16, is connected to a rear end portion of the seat cushion frame 18. A lower end portion of the seat cushion frame 18 is also connected to a floor 24 of a vehicle body through a left and right pair of slide rails 22. Only the slide rail 22 disposed on the left hand side of the vehicle seat 10 is illustrated in FIG. 1. FIG. 2 is a schematic diagram illustrating the slide rail 22.

Each of the slide rails 22 includes an upper rail 26 attached to a lower end portion of the seat cushion frame 18, and a lower rail 28 that is fixed to the floor 24. The lower rail 28 has an elongated lower rail body 30 (rail body) configuring a main body section of the lower rail 28. The lower rail body 30 is disposed in an orientation aligned along the vehicle seat 10 front-rear direction (the seat front-rear direction). The front end side and the rear end side of the lower rail body 30 are connected to the floor 24 through a pair of front and rear brackets 32, 34.

As shown in FIG. 3, the lower rail body 30 is formed in a substantially rectangular cross-section tube shape (a substantially C-shaped cross-section), formed with a slit 36 in a left-right direction central portion of the top wall. The slit 36 extends along the length direction of the lower rail body 30. An elongated upper rail body 38 configuring a main body section of the upper rail 26 is housed at the inside of the lower rail body 30.

The upper rail body 38 is formed with a substantially W-shaped cross-section and is disposed oriented with the length direction aligned along the seat front-rear direction. A connection portion 40 to the seat body 12 extends out upwards from a left-right direction central portion at an upper portion of the upper rail body 38. The connection portion 40 passes through the slit 36 of the lower rail body 30 so as to project out upwards from the lower rail body 30.

As shown in FIG. 2, and the cross-sections on line C-C and on line D-D of FIG. 3, a pair of slide guides 42, 44 are disposed in a row along the seat front-rear direction in a gap between the lower rail body 30 and the upper rail body 38. Each of the slide guides 42, 44 includes a guide body 46 formed by sheet metal folding (see FIG. 5).

Plural balls 48 are rotatably mounted to top portions and bottom portions of the guide body 46. The plural balls 48 mounted to the top portion of the guide body 46 are interposed between the top wall of the lower rail body 30 and the upper face of the upper rail body 38. The plural balls 48 mounted to the bottom portions of the guide body 46 are interposed between the bottom wall of the lower rail body 30 and the bottom face of the upper rail body 38. Each of the upper rail bodies 38 is accordingly supported by the lower rail body 30 through the balls 48 of the front and rear pair of slide guides 42, 44. Each of the upper rails 26 is hence capable of sliding in the seat front-rear direction with respect to the respective lower rail 28.

As shown in the cross-section on line A-A of FIG. 3, a front lower projection portion 50 formed in a block shape is provided at a front end portion of the lower rail body 30. The front lower projection portion 50 is formed as a separated body from the lower rail body 30, and fixed to the bottom wall of the lower rail body 30 so as to project upwards from the bottom wall of the lower rail body 30. The front lower projection portion 50 is disposed further to the right hand side than a seat left-right direction central portion of the lower rail body 30.

As shown in the cross-section on line B-B of FIG. 3, a front upper projection portion 52 is provided to an intermediate portion of the upper rail body 38 further to the front end side of the upper rail body 38 than the front-rear direction central portion of the upper rail body 38. The front upper projection portion 52 is formed by cutting around and projecting out a portion at a left-right direction intermediate portion of the upper rail body 38, and is disposed further to the seat left hand side than the seat left-right direction central portion of the upper rail body 38.

As shown in the cross-section on line C-C of FIG. 3, a right hand side contact portion 54 (first side contact portion) is provided to the guide body 46 of the slide guide 42 on the seat front side. The right hand side contact portion 54 is formed by a portion on the bottom wall of the guide body 46 pressed out upwards with a trapezoidal cross-section profile. The right hand side contact portion 54 is disposed further to the seat right hand side than the seat left-right direction central portion of the upper rail body 38 and the lower rail body 30. The right hand side contact portion 54 corresponds to the front lower projection portion 50.

As shown in the cross-section taken on line D-D of FIG. 3, a left hand side contact portion 56 (second side contact portion) is provided on the guide body 46 of the slide guide 44 at the seat rear side. The left hand side contact portion 56 is configured basically the same as the right hand side contact portion 54 of the slide guide 42, however the left hand side contact portion 56 is disposed further to the seat left hand side than the left-right direction central portion of the upper rail body 38 and the lower rail body 30, and is left-right symmetrical to the right hand side contact portion 54. The left hand side contact portion 56 corresponds to the front upper projection portion 52. In the present exemplary embodiment the pair of slide guides 42, 44 are configured exactly the same as each other.

As shown in the cross-section taken on line E-E of FIG. 3, a rear upper projection portion 58 is provided to an intermediate portion of the upper rail body 38, further to the rear end side of the upper rail body 38 than the front-rear direction central portion of the upper rail body 38. The rear upper projection portion 58 is configured basically the same as the front upper projection portion 52, however the rear upper projection portion 58 is disposed further to the seat right hand side than the seat left-right direction central portion of the upper rail body 38, and is left-right symmetrical to the front upper projection portion 52. The rear upper projection portion 58 corresponds to the front lower projection portion 50 and the right hand side contact portion 54.

As shown in the cross-section taken on line F-F of FIG. 3, a rear lower projection portion 60 formed in a block shape is provided to a rear end portion of the lower rail body 30. The rear lower projection portion 60 is configured basically the same as the front lower projection portion 50, however the rear lower projection portion 60 is disposed further to the seat left hand side than the seat left-right direction central portion of the lower rail body 30, and is left-right symmetrical to the front lower projection portion 50. The rear lower projection portion 60 corresponds to the front upper projection portion 52 and the left hand side contact portion 56.

In the first exemplary embodiment, as shown in FIG. 2, the separation between the front upper projection portion 52 and the rear upper projection portion 58 is set so as to be narrower than the separation between the front lower projection portion 50 and the rear lower projection portion 60. In a state in which the upper rail 26 is disposed at the center of its sliding range with respect to the lower rail 28 (referred to below as the neutral state), the slide guide 42 on the seat front side is disposed at the center between the front lower projection portion 50 and the rear upper projection portion 58, and the slide guide 44 on the seat rear side is disposed in the center between the front upper projection portion 52 and the rear lower projection portion 60. In the neutral state the front upper projection portion 52 is disposed in front of and in the vicinity of the slide guide 42 on the seat front side, and the rear upper projection portion 58 is disposed to the rear of and in the vicinity of the slide guide 44 on the seat rear side.

Figure 5A:
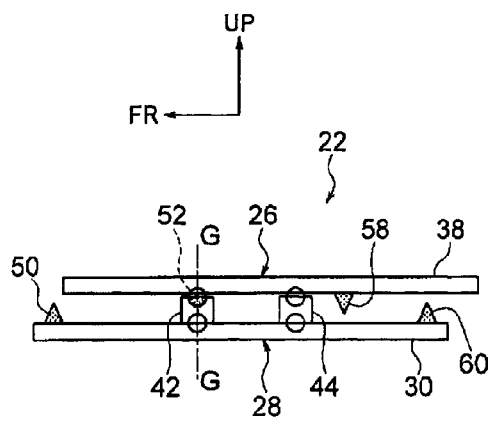
FIG. 5A is a schematic diagram for explaining a state in which the upper rail of the slide rail according to the first exemplary embodiment of the present invention has slid by a small amount towards the seat rear side with respect to the lower rail.
Figure 5B:
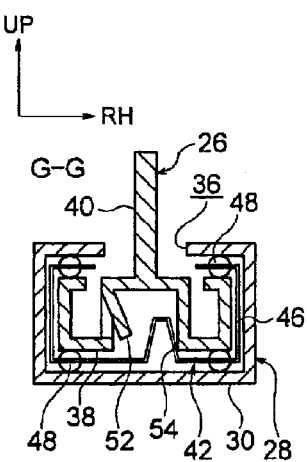
FIG. 5B is a vertical cross-section corresponding to line G-G of FIG. 5A.

When the upper rail 26 is slid from the neutral state towards the seat rear side with respect to lower rail 28, as shown in FIG. 5A, the front upper projection portion 52 and the slide guide 42 on the seat front side overlap with each other as viewed from the side. However, when this occurs interference between the two components is avoided by, as shown in FIG. 5B, disposing the front upper projection portion 52 and the right hand side contact portion 54 displaced from each other along the seat left-right direction.

Figure 6A:
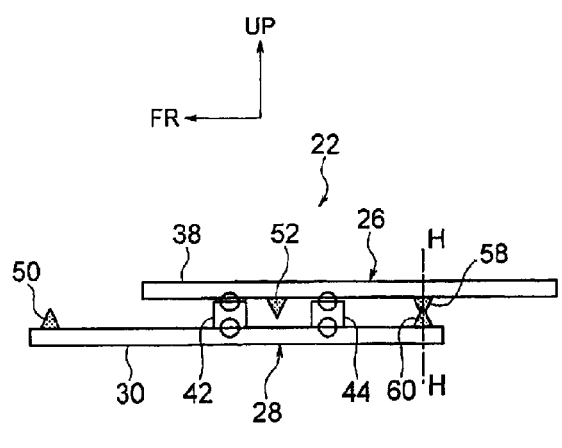
FIG. 6A is a schematic diagram for explaining a state in which the upper rail has slid further towards the seat rear side from the state illustrated in FIG. 5.
Figure 6B:
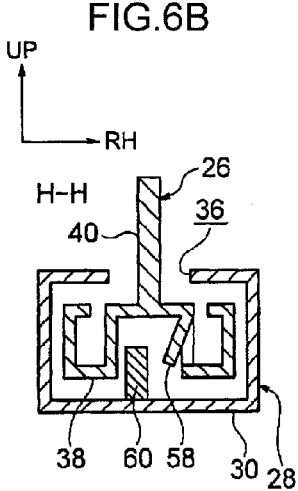
FIG. 6B is a vertical cross-section corresponding to line H-H of FIG. 6A.

When the upper rail 26 slides further from the state illustrated in FIG. 5A towards the seat rear side with respect to the lower rail 28, the rear upper projection portion 58 and the rear lower projection portion 60 then overlap with each other when viewed from the side, as shown in FIG. 6A. However, when this occurs interference between the two components is avoided by, as shown in FIG. 6B, disposing the rear upper projection portion 58 and the rear lower projection portion 60 displaced from each other along the seat left-right direction.

Figure 7A:
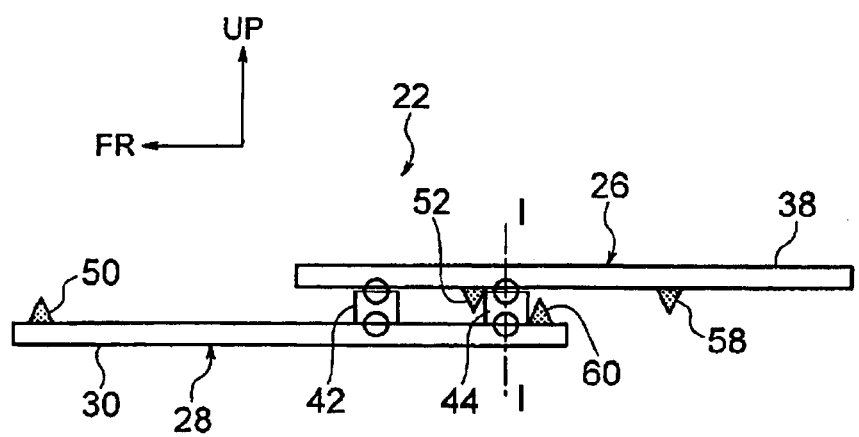
FIG. 7A is a schematic diagram for explaining a state in which the upper rail has slid to the maximum extent towards the seat rear side.
Figure 7B:
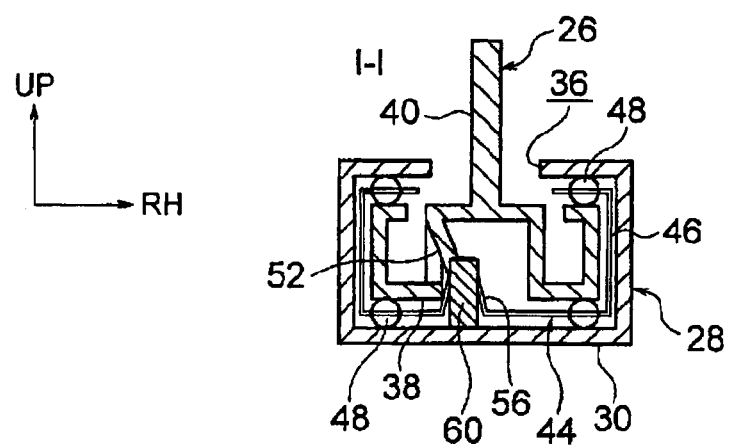
FIG. 7B is a vertical cross-section corresponding to line I-I of FIG. 7A.

When the upper rail 26 slides further from the state illustrated in FIG. 6A towards the seat rear side with respect to the lower rail 28, as shown in FIG. 7A, the front upper projection portion 52 approaches the vicinity of the rear lower projection portion 60, and the left hand side contact portion 56 of the slide guide 44 on the seat rear side is sandwiched between the front upper projection portion 52 and the rear lower projection portion 60 (see FIG. 7B). The upper rail 26 is accordingly restricted from sliding towards the seat rear side with respect to the lower rail 28 (referred to below as the rear-most state).

Similarly, when the upper rail 26 has been slid towards the seat front side with respect to the lower rail 28, the right hand side contact portion 54 of the slide guide 42 on the seat front side is sandwiched between the rear upper projection portion 58 and the front lower projection portion 50, restricting sliding of the upper rail 26 towards the seat front side with respect to the lower rail 28 (referred to below as the front-most state).

Figure 8:
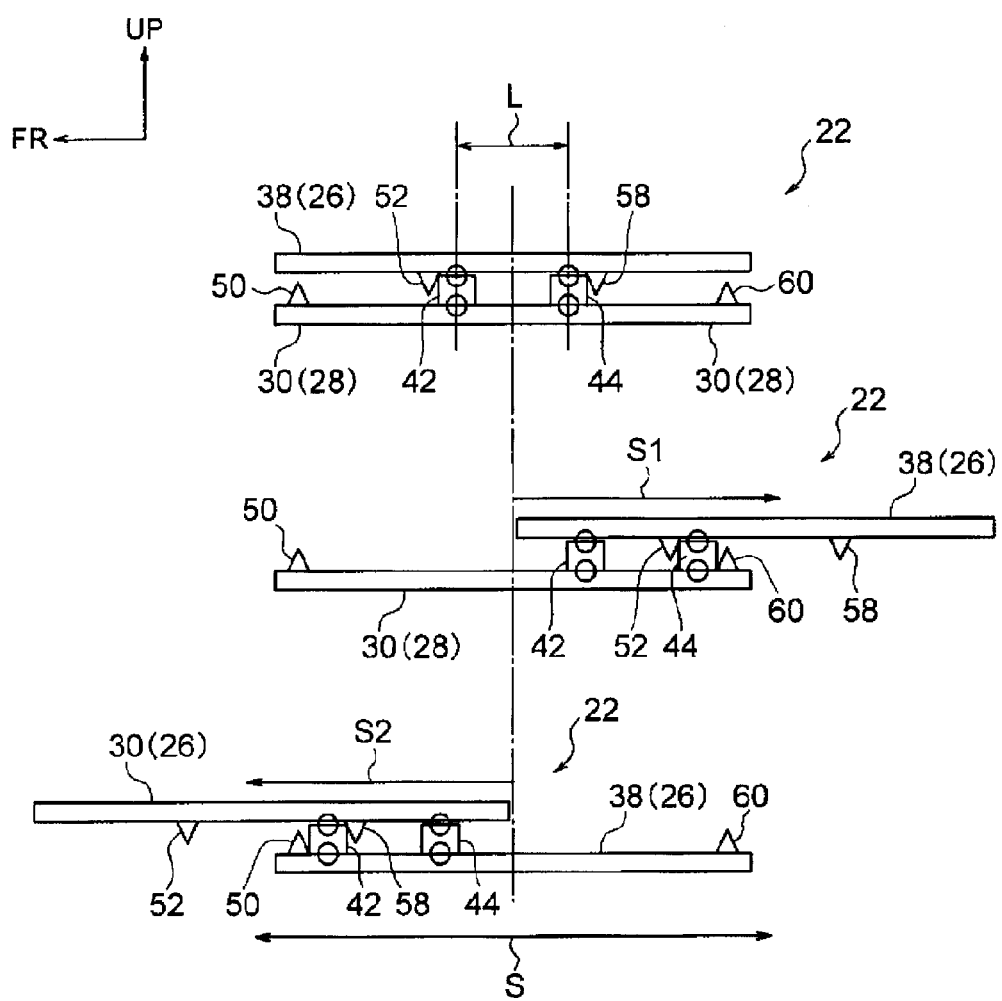
FIG. 8 is a schematic diagram illustrating a neutral state, a rear-most state and a front-most state of a slide rail according to a first exemplary embodiment of the present invention.
Figure 9:
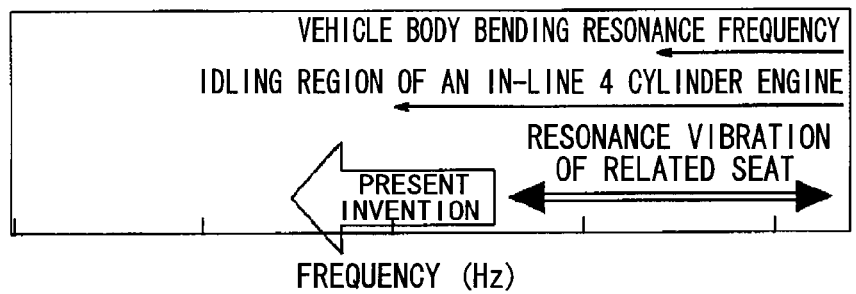
FIG. 9 is a chart for explaining vibration of a vehicle seat and frequencies such as a bending resonance frequency of a vehicle body.

Namely, in the first exemplary embodiment, as shown in FIG. 8, the sum of sliding amount s1 of the upper rail 26 from the neutral state to the rear-most state and sliding amount s2 from the neutral state to the front-most state is a maximum slide amount S of the upper rail 26 with respect to the lower rail 28. A separation distance L between the seat front-rear direction central portion of the slide guide 42 on the seat front side and the seat front-rear direction central portion of the slide guide 44 on the seat rear side is set to be narrower than half of the maximum slide amount S (L<S/2). In the first exemplary embodiment, the separation distance L is set narrower than half the total length of the upper rail 26 and the lower rail 28.

Explanation follows regarding operation and effects of the first exemplary embodiment.

In the vehicle seat 10 configured as described above, the separation distance L of each of the front and rear pairs of the slide guides 42, 44 is made narrower than a specific value (narrower than half the maximum slide amount S of the upper rail 26 with respect to the lower rail 28). The supporting rigidity to the seat body 12 from the vehicle body is therefore lowered, lowering the front-rear direction resonance frequency of the seat body 12. The front-rear direction resonance frequency of the seat body 12 can accordingly be shifted away from, for example the resonance frequency of the vehicle body such as during vehicle engine idling (see FIG. 9). Consequently, vibration can be suppressed from occurring in the seat body 12 without adding an additional separate device such as a dynamic damper. Accordingly, the vehicle seat 10 can at low cost raise the noise and vibration performance (capability to suppress vibration and vibration noise, referred to below as NV performance).

Figure 10:
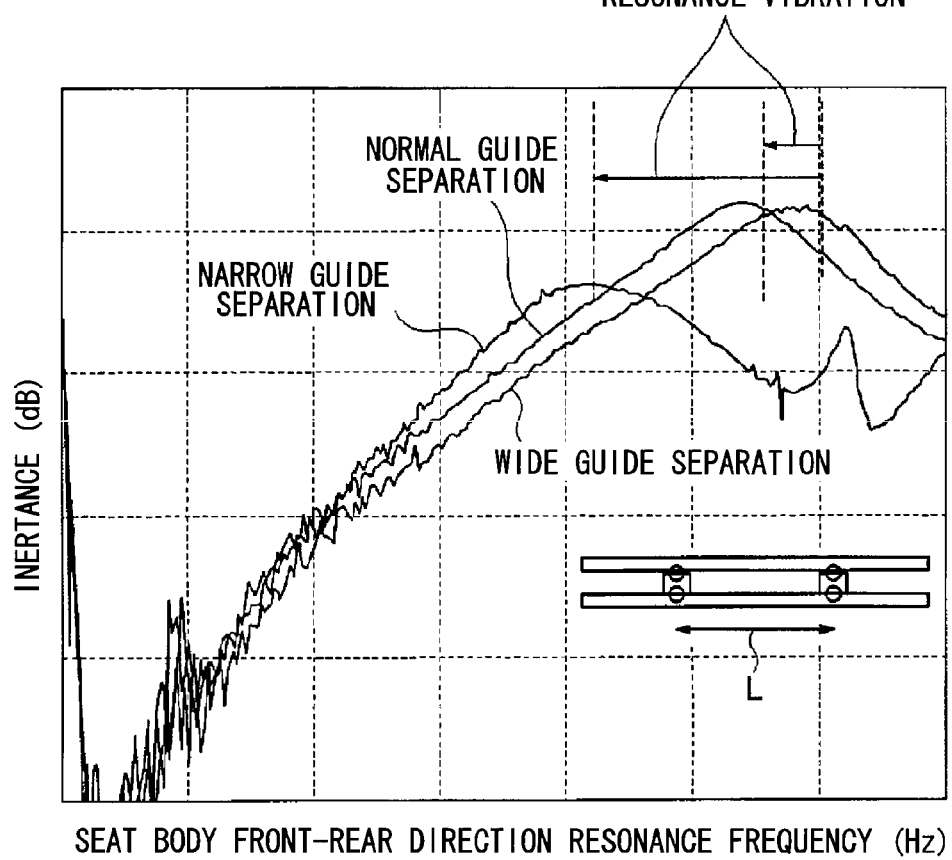
FIG. 10 is a graph illustrating relationships between inertance and front-rear direction resonance frequencies of a seat body.

FIG. 10 is a line graph illustrating measurement results of front-rear direction resonance frequency of the seat body 12 when the separation distance L of the slide guides 42, 44 is changed in 3 stages (wide, normal, narrow). It can be seen from FIG. 10 that the front-rear direction resonance frequency of the seat body 12 can be greatly lowered by making the separation distance L of the slide guides 42, 44 narrower. Accordingly, in the vehicle seat 10, the front-rear direction resonance frequency of the seat body 12 can for example be shifted from the resonance frequency of the vehicle body such as during idling, and vibrations can be suppressed from occurring in the seat body 12.

However, in the vehicle seat 10, the upper rail 26 is restrained from sliding towards the seat rear side with respect to the lower rail 28 by the left hand side contact portion 56 provided to the slide guide 44 on the seat rear side being sandwiched between the front upper projection portion 52 disposed further to the seat front side than the front-rear direction central portion of the upper rail 26 and the rear lower projection portion 60 provided to the rear end portion of the lower rail 28. The upper rail 26 is also restrained from sliding towards the seat front side with respect to the lower rail 28 by the right hand side contact portion 54 provided to the slide guide 42 on the seat front side being sandwiched between the rear upper projection portion 58 disposed further to the seat rear side of the front-rear direction central portion of the upper rail 26 and the front lower projection portion 50 provided to the front end portion of the lower rail 28.

Consequently, in the vehicle seat 10 both the sliding amount s1 of the upper rail 26 from the neutral state to the rear-most state and the sliding amount s2 of the upper rail 26 from the neutral state to the front-most state can be set large. This enables the maximum slide amount S (s1+s2) of the upper rail 26 with respect to the lower rail 28 to also be set larger than the overall length of each of the upper rails 26 and each of the lower rails 28. Accordingly the vehicle seat 10 can solve various of the problems occurring in slide rails of related vehicle seats.

Figure 11:
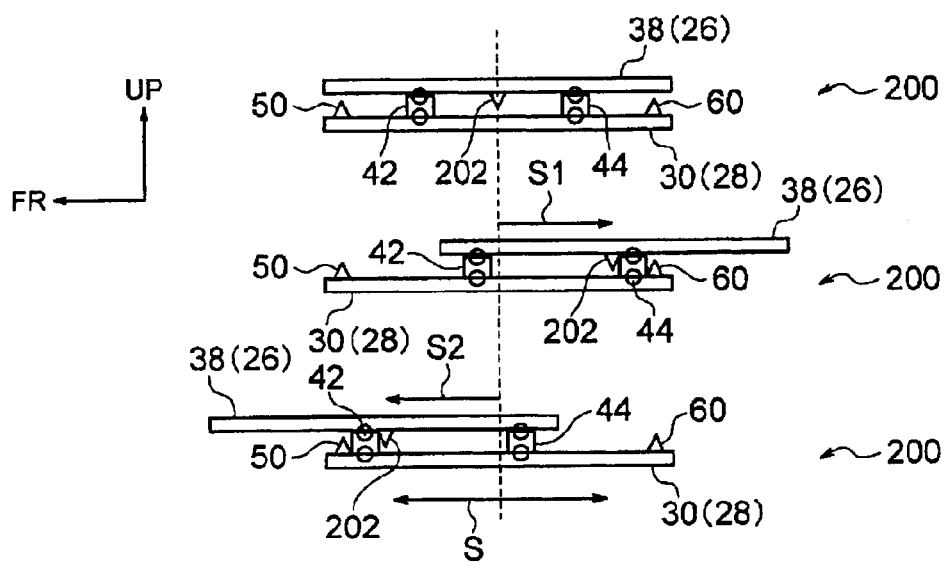
FIG. 11 is a schematic diagram illustrating a neutral state, a rear-most state and a front-most state of a related slide rail.
Figure 12:
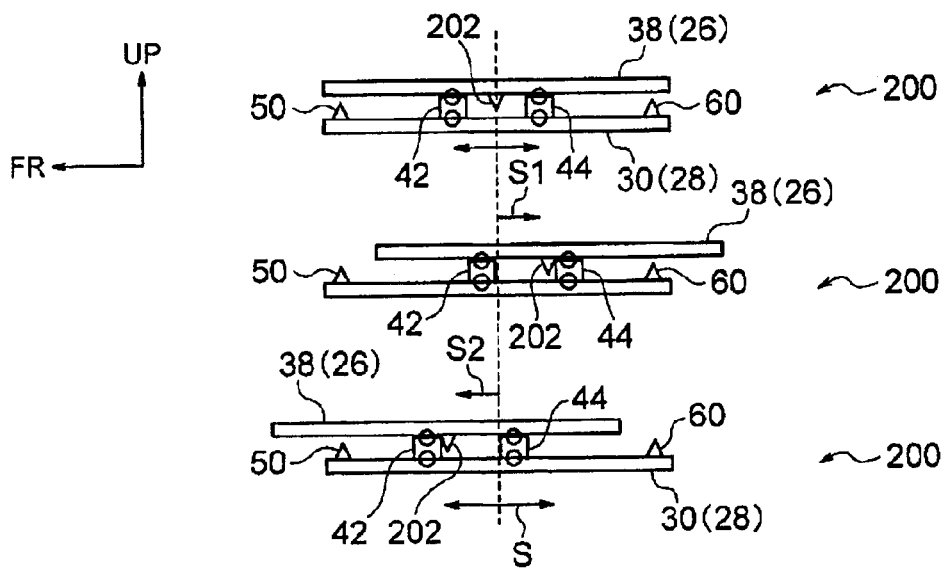
FIG. 12 is schematic diagram illustrating a neutral state, a rear-most state and a front-most state in a related slide rail in which the separation distance of a pair of slide guides has been narrowed.

Namely, in a case when one projection portion 202 is provided at the front-rear direction central portion of the upper rail body 38 as in the related slide rail 200 shown in FIG. 11, the maximum slide amount S of the upper rail 26 with respect to the lower rail 28 can only be set at about twice the separation distance L of the slide guides 42, 44. Hence when the separation distance L of the slide guides 42, 44 is narrowed in order to raise NV performance, as shown in FIG. 12, the maximum slide amount S of the upper rail 26 (namely of the seat body 12) is also narrowed. In the related slide rail 200 it is therefore not possible to both raise NV performance and maintain the maximum slide amount S.

However regarding this aspect, in the slide rail 22 of the vehicle seat 10, since a large maximum slide amount S of the upper rail 26 with respect to the lower rail 28 can be set even when the separation distance L of the slide guides 42, 44 is narrowed, raised NV performance and maintained maximum slide amount S can be both achieved at the same time.

Figure 13:
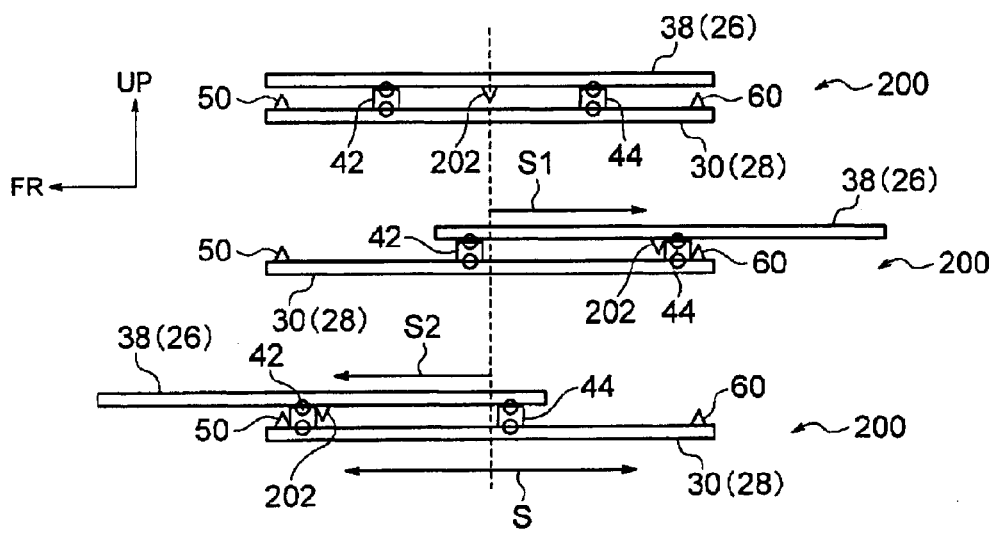
FIG. 13 is schematic diagram illustrating a neutral state, a rear-most state and a front-most state in a related slide rail in which the rail length has been extended.

Furthermore, in the related slide rail 200, when the maximum slide amount S is increased in order to raise comfort performance for a seated occupant, as shown in FIG. 13, the overall length of the upper rail 26 and the lower rail 28 needs to be lengthened, increasing the width of the mounting base for the slide rails in the vehicle compartment. Accordingly various problems arise, such as the foot space available for an occupant seated on the rear seat is reduced, a rear seated occupant is less able to get in and out (impeded, made awkward), fuel efficiency is reduced due to the increase in weight of the slide rails, material cost is increased, and product quality is adversely impacted due to bare metal slide rails being exposed to view inside the vehicle compartment (worse appearance).

Regarding these aspects, in the slide rail 22 of the vehicle seat 10, since the maximum slide amount S is increased without increasing the overall length of the lower rail 28 and the upper rail 26, the front seat comfort can be raised while not adversely impacting on the comfort of the rear seats or increasing weight.

Figure 14:
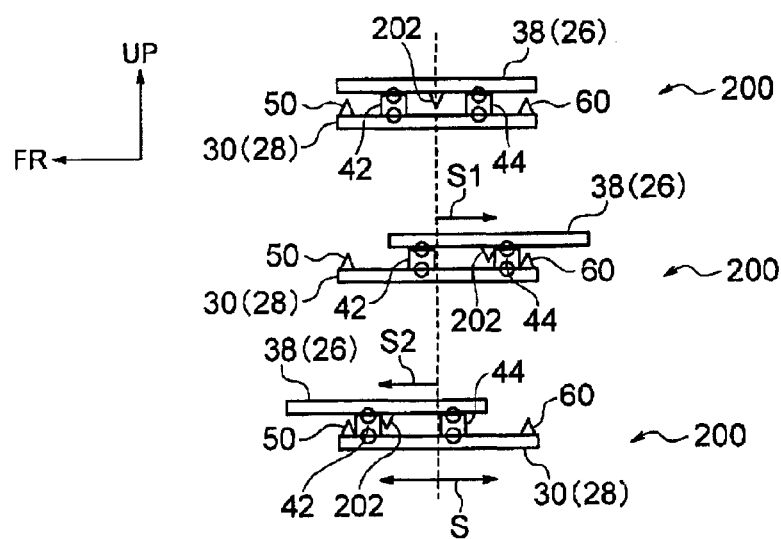
FIG. 14 is schematic diagram illustrating a neutral state, a rear-most state and a front-most state in a related slide rail in which the rail length has been shortened.

Or to put it another way, in order to reduce weight and material cost and improve rear seat comfort there is a need to shorten the overall length of the upper rail 26 and the lower rail 28 in the related slide rail 200, as shown in FIG. 14, however in such a case the maximum slide amount S is also shortened.

Figure 15:
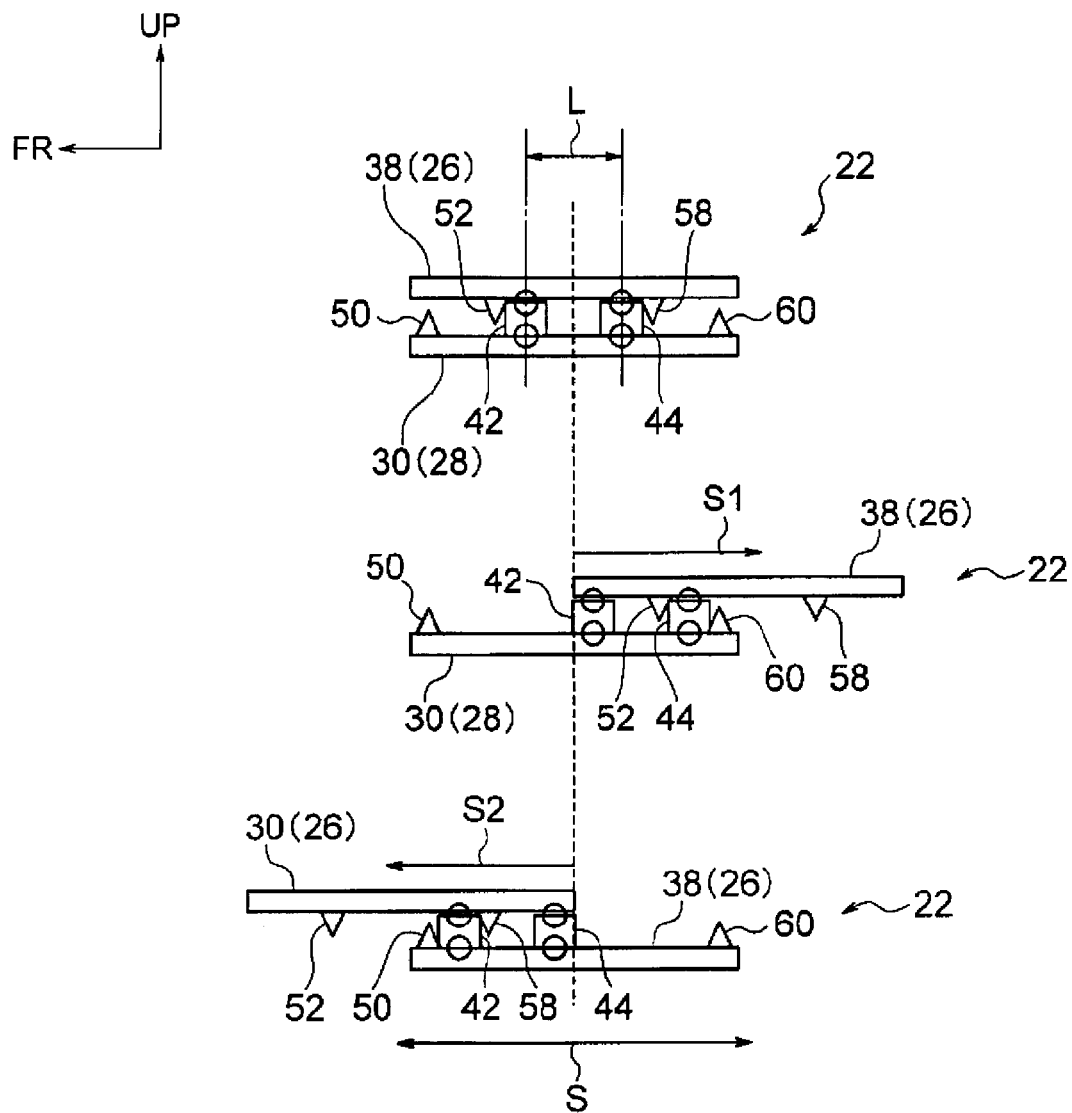
FIG. 15 is schematic diagram illustrating a neutral state, a rear-most state and a front-most state in a slide rail according to the first exemplary embodiment of the present invention in which the rail length has been shortened.

Regarding this aspect, with the slide rail 22 of the vehicle seat 10, the overall length of the upper rail 26 and the lower rail 28 can be shortened while still maintaining the maximum slide amount S, as shown in FIG. 15. Accordingly, such improvements as a reduction in weight can be achieved while still maintaining the maximum slide amount S.

Note that FIG. 16 is a table of comparisons of the slide rail 22 of the vehicle seat 10 (the structure such as illustrated in FIG. 8 and FIG. 15) against the related vehicle seat slide rail 200 (the structure illustrated in FIG. 11 to FIG. 14). It is clear from FIG. 16 that the slide rail structure of the vehicle seat 10 is good in all aspects of NV performance, weight, maximum slide amount, and rear seat comfort performance.

Furthermore, in the slide rail structure of the vehicle seat 10, the front upper projection portion 52, the rear lower projection portion 60 and the left hand side contact portion 56 are disposed further to the seat left hand side than the seat left-right direction central portions of the upper rail 26 and the lower rail 28, and the rear upper projection portion 58, the front lower projection portion 50 and the right hand side contact portion 54 are disposed further to the seat right hand side than the seat left-right direction central portions of the upper rail 26 and the lower rail 28. Accordingly, a simple structure is achieved that enables unwanted interference of the rear upper projection portion 58 with respect to the rear lower projection portion 60 and the left hand side contact portion 56, and unwanted interference of the front upper projection portion 52 with the front lower projection portion 50 and the right hand side contact portion 54 to be avoided.

In the slide rail structure of the vehicle seat 10, the front lower projection portion 50 is provided at a front end portion of the lower rail 28, and the rear lower projection portion 60 is provided at a rear end portion of the lower rail 28. Accordingly, the front lower projection portion 50 and the rear lower projection portion 60 can be configured as a common component as a detachment prevention stopper for preventing detachment of the slide guides 42, 44 from at the front-rear direction end portions of the lower rail 28, respectively.

The slide rail 22 according to the first exemplary embodiment exhibits similar capabilities when used with the upper rail 26 and the lower rail 28 turned upside down. However, in such a configuration the detachment prevention stoppers of the slide guides 42, 44 need to be provided to the two front and rear end portions of the upper rail 26 disposed on the bottom side.

Explanation follows regarding a modified example of the slide rail 22 according to the first exemplary embodiment.

First Modified Example

Figure 17A:
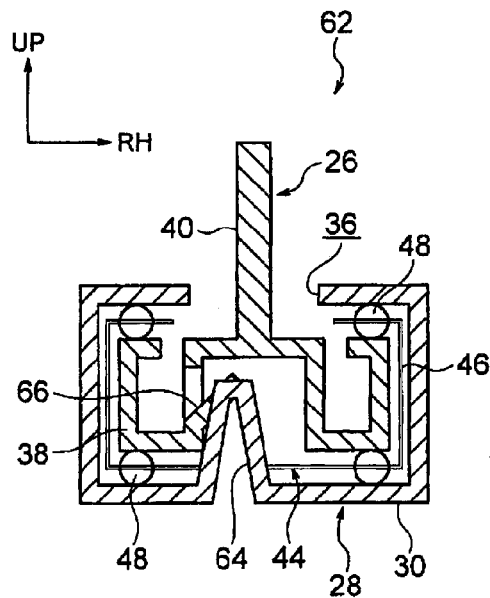
FIG. 17A is a vertical cross-section of a slide rail according to a first modified example of the first exemplary embodiment of the present invention.

FIG. 17A is a schematic vertical cross-section illustrating a configuration of a slide rail 62 according to a first modified example of the above first exemplary embodiment. The slide rail 62 is configured basically the same as the slide rail 22 according to the first exemplary embodiment, however it differs therefrom in that a rear lower projection portion 64 and a front upper projection portion 66 are configured in place of the rear lower projection portion 60 and the front upper projection portion 52 of the first exemplary embodiment.

Figure 17B:
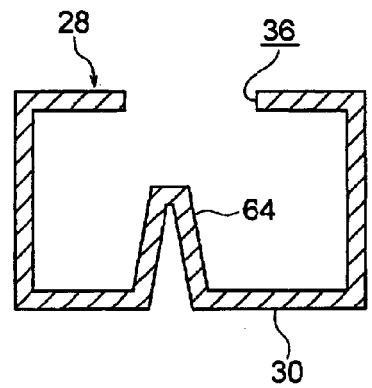
FIG. 17B is a vertical cross-section of a lower rail of the slide rail.
Figure 17C:
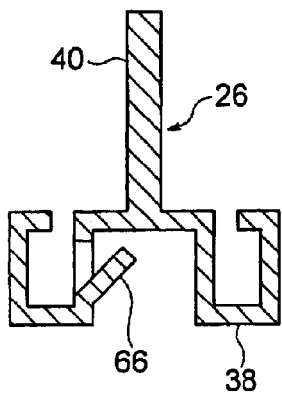
FIG. 17C is a vertical cross-section of an upper rail of the slide rail.
Figure 17D:
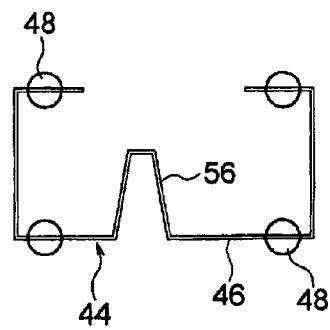
FIG. 17D is a face-on view of the slide guide of the slide rail.

As shown in FIG. 17B, the rear lower projection portion 64 is formed by a portion of the bottom wall of the lower rail 28 pressed out upwards with a trapezoidal cross-section profile. As shown in FIG. 17C, the front upper projection portion 66, similarly to the front upper projection portion 52, is formed by cutting around and projecting out a portion of the upper rail 26, however the direction of cutting around and projecting out is different to that of the front upper projection portion 52.

In the first modified example too, sliding of the upper rail 26 towards the seat rear side with respect to the lower rail 28 is restricted by a left hand side contact portion 56 (see FIG. 17D) provided to the slide guide 44 being sandwiched between the front upper projection portion 66 and the rear lower projection portion 64.

Figure 18A:
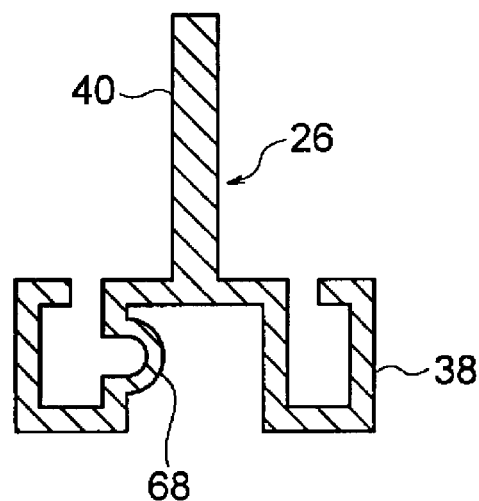
FIG. 18A is a vertical cross-section illustrating a modified example of the upper rail illustrated in FIG. 17C.
Figure 18B:
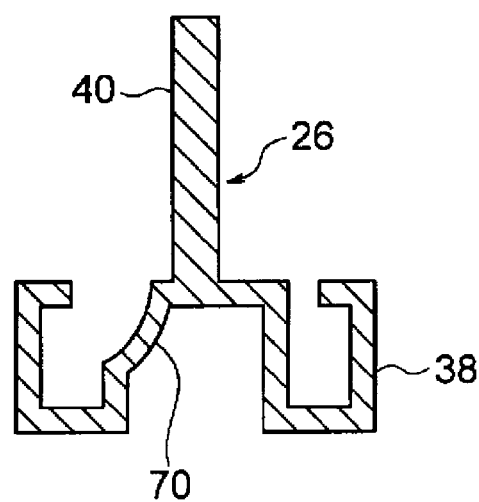
FIG. 18B is another modified example of the upper rail illustrated in FIG. 17C.

Configuration may be made such that a front upper projection portion 68 as illustrated in FIG. 18A, or a front upper projection portion 70 as illustrated in FIG. 18B, is employed in place of the front upper projection portion 66. The front upper projection portions 68, 70 are formed by portions of the upper rail 26 pressed out towards the inside.

Second Modified Example

Figure 19A:
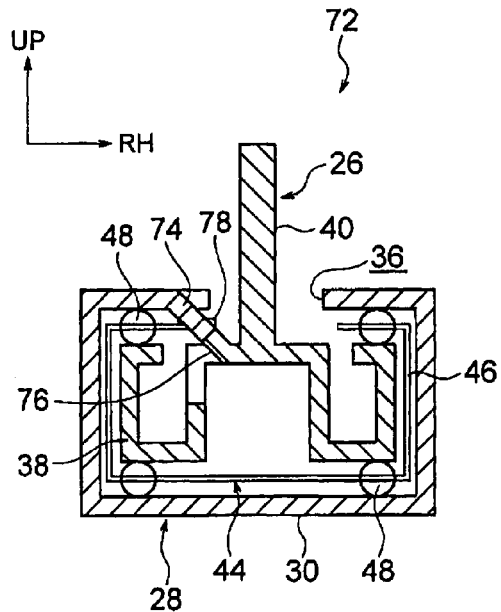
FIG. 19A is a vertical cross-section of a slide rail according to a second modified example of the first exemplary embodiment of the present invention.

A schematic vertical cross-section of a configuration of a slide rail 72 according to a second modified example of the first exemplary embodiment is illustrated in FIG. 19A. The slide rail 72 is configured basically the same as the slide rail 22 according to the first exemplary embodiment, however a rear lower projection portion 74, a front upper projection portion 76 and a right hand side contact portion 78 differ from the rear lower projection portion 60, the front upper projection portion 52 and the right hand side contact portion 56 of the first exemplary embodiment.

Figure 19B:
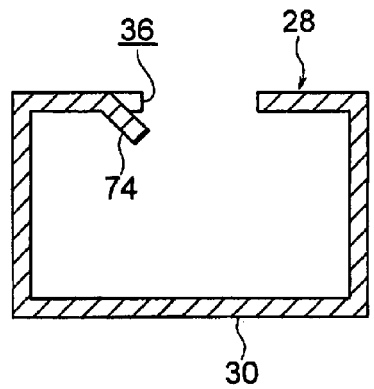
FIG. 19B is a vertical cross-section of a lower rail of the slide rail.
Figure 19C:
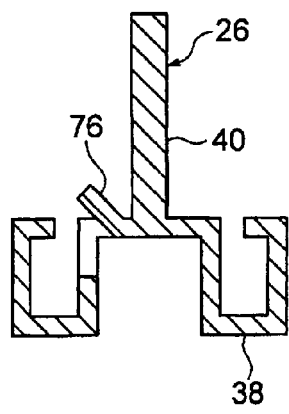
FIG. 19C is a vertical cross-section of an upper rail of the slide rail.
Figure 19D:
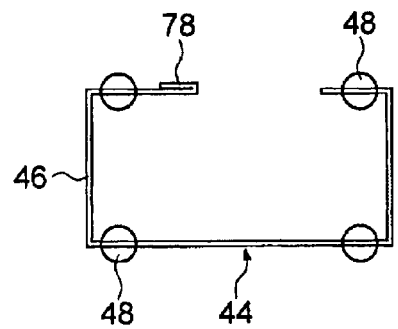
FIG. 19D is a face-on view of the slide guide of the slide rail.

As shown in FIG. 19B the rear lower projection portion 74 is formed by bending a portion on the top wall of the lower rail 28 so as to face downwards. As shown in FIG. 19C, the front upper projection portion 76 is formed by cutting around a portion of the upper rail 26 and projecting it upwards. As shown in FIG. 19D, the left hand side contact portion 78 is provided in the top wall of the guide body 46 of the slide guide 44.

In the second modified example too, the upper rail 26 is restricted from sliding with respect to the lower rail 28 towards the seat rear side by the left hand side contact portion 78 provided to the slide guide 44 being sandwiched between the front upper projection portion 76 and the rear lower projection portion 74.

Third Modified Example

Figure 20A:
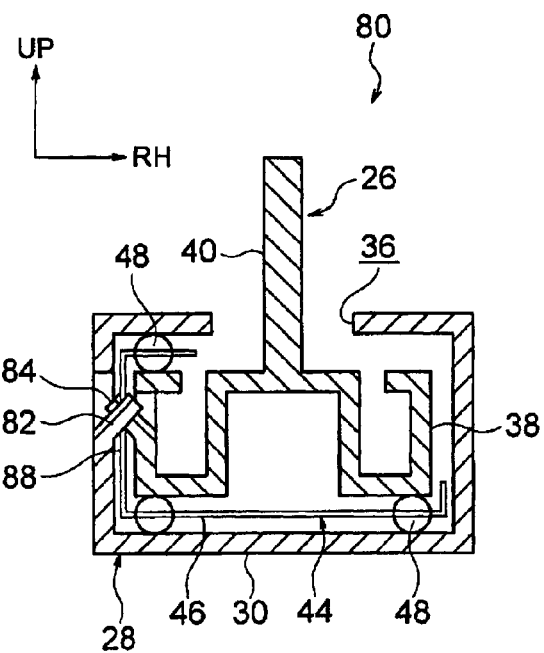
FIG. 20A is a vertical cross-section of a slide rail according to a third modified example of the first exemplary embodiment of the present invention.

FIG. 20A illustrates a schematic vertical cross-section of a configuration of a slide rail 82 according to a third modified example of the first exemplary embodiment. The slide rail 82 is configured basically the same as the slide rail 22 according to the first exemplary embodiment, however a rear lower projection portion 82, a front upper projection portion 84 and a slide guide 86 differ from the rear lower projection portion 60, the front upper projection portion 52 and the slide guide 46 according to the first exemplary embodiment.

Figure 20B:
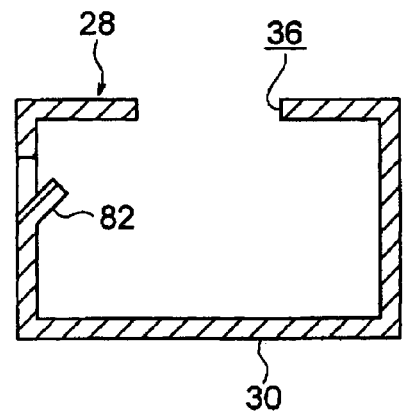
FIG. 20B is a vertical cross-section of a lower rail of the slide rail.
Figure 20C:
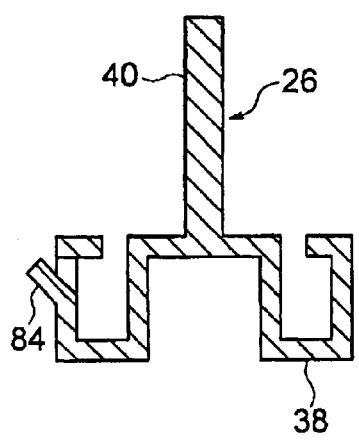
FIG. 20C is a vertical cross-section of an upper rail of the slide rail.
Figure 20D:
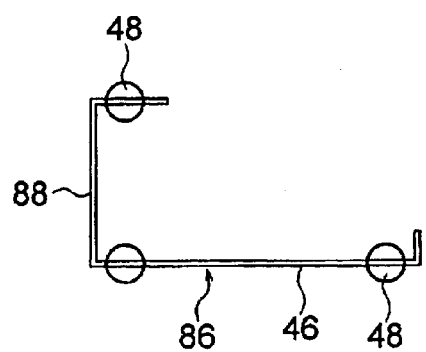
FIG. 20D is a face-on view of the slide guide of the slide rail.

As shown in FIG. 20B, the rear lower projection portion 82 is formed by cutting around and projecting out a portion of the side wall of a lower rail 28 towards the inside of the lower rail 28. As shown in FIG. 20C, the front upper projection portion 84 is formed by cutting around and projecting out a portion at the left-right direction end portion of the upper rail 26 towards the outside. As shown in FIG. 20D, the slide guide 86 is configured without the side wall and the top wall at the right hand side of the guide body 46, with a left hand side contact portion 88 configured by a top-bottom direction intermediate portion of the left hand side wall.

In the third modified example too, the upper rail 26 is restricted from sliding with respect to the lower rail 28 towards the seat rear side by the left hand side contact portion 88 provided to the slide guide 86 being sandwiched between the front upper projection portion 84 and the rear lower projection portion 82.

Fourth Modified Example

Figure 21A:
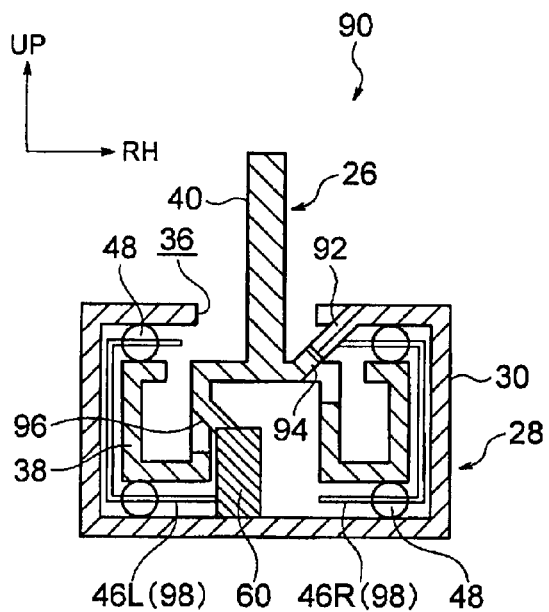
FIG. 21A is a vertical cross-section of a slide rail according to a fourth modified example of the first exemplary embodiment of the present invention.

FIG. 21A is a schematic vertical cross-section illustrating a configuration of a slide rail 90 according to a fourth modified example of the first exemplary embodiment. The slide rail 90 is configured basically the same as the slide rail 22 according to the first exemplary embodiment, however two rear lower projection portions 60, 92 and two front upper projection portions 94, 96 are provided. A slide guide 98 of the slide rail 90 is also configured so as to be separated on the left and right.

Figure 21B:
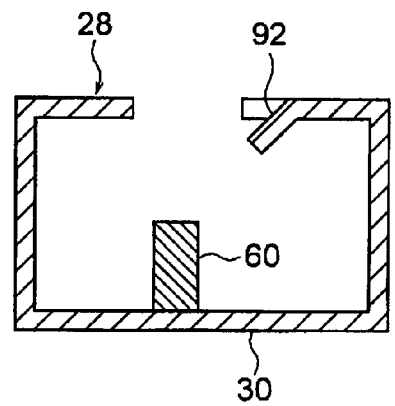
FIG. 21B is a vertical cross-section of a lower rail of the slide rail.
Figure 21C:
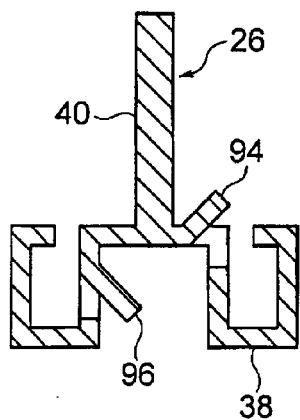
FIG. 21C is a vertical cross-section of an upper rail of the slide rail.
Figure 21D:
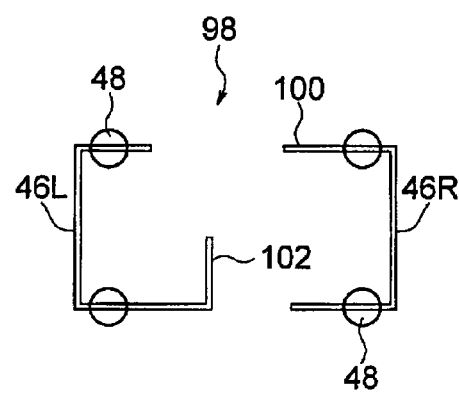
FIG. 21D is a face-on view of the slide guide of the slide rail.

As shown in FIG. 21B, the rear lower projection portion 92 is formed by cutting out around and projecting a portion of the top wall of the lower rail 28 out downwards. As shown in FIG. 21C, the front upper projection portions 94, 96 are formed by cutting around and projecting out portions of the upper rail 26. As shown in FIG. 20D, the slide guide 98 has a guide body 46 that is divided into a right hand side member 46R and a left hand side member 46L. An upper side contact portion 100 is configured at an end portion on the top wall of the right hand side member 46R. A lower side contact portion 102 is also formed to an end portion of the bottom wall of the left hand side member 46L so as to bend around upwards.

In the fourth modified example, the upper rail 26 is restricted from sliding with respect to the lower rail 28 towards the seat rear side by the upper side contact portion 100 provided to the right hand side member 46R of the slide guide 98 being sandwiched between the front upper projection portion 94 and the rear lower projection portion 92, and the lower side contact portion 102 provided to the left hand side member 46L being sandwiched between the front upper projection portion 96 and the rear lower projection portion 60.

The first modified example is most preferable out of the four modified examples described above from the perspectives of strength and ease of manufacture. In the above four modified examples reference has not been made to the front lower projection portion and the rear upper projection portion, however the front lower projection portion and the rear upper projection portion are configured so as to be left-right symmetrical to the rear lower projection portion and the front upper projection portion, and similar structures can be employed to those of the above four modified examples.

Explanation next follows regarding another exemplary embodiment of the present exemplary embodiment. Note that configuration and operation that is basically the same as that of the first exemplary embodiment is appended with the same reference numerals to those of the first exemplary embodiment and further explanation thereof is omitted.

Second Exemplary Embodiment

Figure 22:
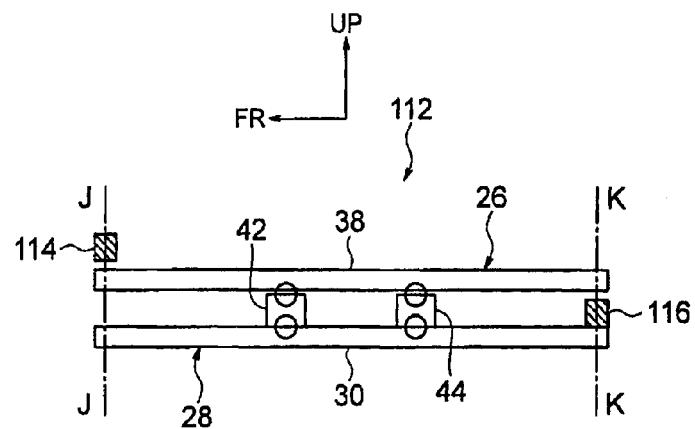
FIG. 22 is a schematic diagram of a slide rail that is a configuration member of a vehicle seat according to a second exemplary embodiment of the present invention.
Figure 23A:
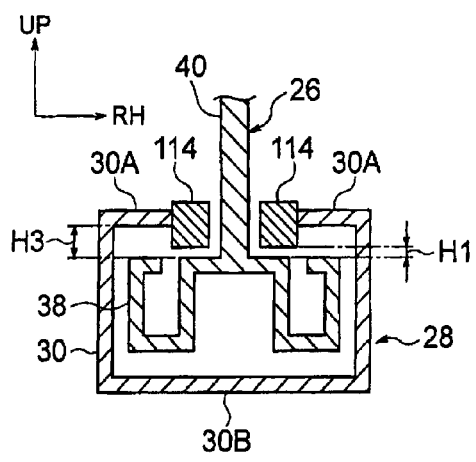
FIG. 23A is a vertical cross-section corresponding to line J-J in FIG. 22.
Figure 23B:
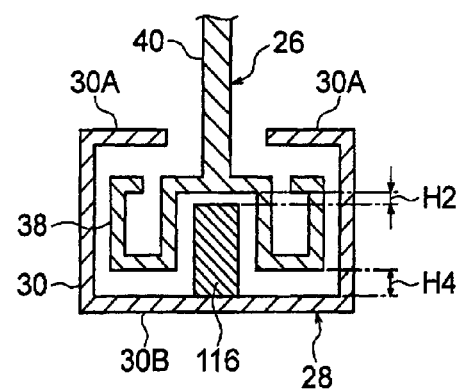
FIG. 23B is a vertical cross-section corresponding to line K-K in FIG. 22.

FIG. 22 is a schematic diagram illustrating a slide rail 112 that is a configuration member of a vehicle seat 110 (see FIG. 24) according to a second exemplary embodiment of the present invention. FIG. 23A is a vertical cross-section corresponding to line J-J in FIG. 22, and FIG. 23B is a vertical cross-section corresponding to line K-K in FIG. 22.

The slide rail 112 is of basically the same configuration as that of the slide rail 22 according to the first exemplary embodiment, however in the slide rail 112, a left and right pair of projection portions 114 employed as load bearings are provided to a front end portion of the lower rail body 30, and a projection portion 116 employed as a load bearing is provided to a rear end portion of the lower rail body 30. For ease of explanation, the front lower projection portion 50, the rear lower projection portion 60, the front upper projection portion 52 and the rear upper projection portion 58 are omitted from illustration in FIG. 22 to FIG. 27.

The left and right pair of projection portions 114 provided at the front end portion of the lower rail body 30 are each formed in a block shape, and fixed by welding to a top wall 30A of the lower rail body 30. The projection portions 114 project out from the bottom face side of the top wall 30A (the side facing towards the top face of the upper rail body 38), and each bottom end thereof faces towards the top face of the upper rail body 38 with a separation thereto of specific gap H1.

The projection portion 116 provided to the rear end portion of the lower rail body 30 is also formed in a block shape, and fixed by welding to the top face of a bottom wall 30B of the lower rail body 30 (the face facing towards the bottom face of the upper rail body 38). The top end of the projection portion 116 faces towards the bottom face of the upper rail body 38 with a separation thereto of a specific gap H2.

The "top face of the upper rail body 38" is the "top face of the upper rail 26", and the "bottom face of the upper rail body 38" is the "bottom face of the upper rail 26". The "top wall 30A of the lower rail body 30" is the "top wall of the lower rail 28", and the "bottom wall 30B of the lower rail body 30" is the "bottom wall of the lower rail 28".

As shown in FIG. 23A, the gap H1 between the bottom end of the projection portion 114 and the top face of the upper rail body 38 is set so as to be narrower than a gap H3 between the top wall 30A of the lower rail body 30 and the upper rail body 38. As shown in FIG. 23B, the gap H2 between the top end of the projection portion 116 and the bottom face of the upper rail body 38 is set so as to be narrower than a gap H4 between the bottom wall 30B of the lower rail body 30 and the upper rail body 38. The gap H1 and the gap H2 are also set with equivalent dimensions to each other.

Explanation follows regarding operation and effect of the second exemplary embodiment.

Figure 24:
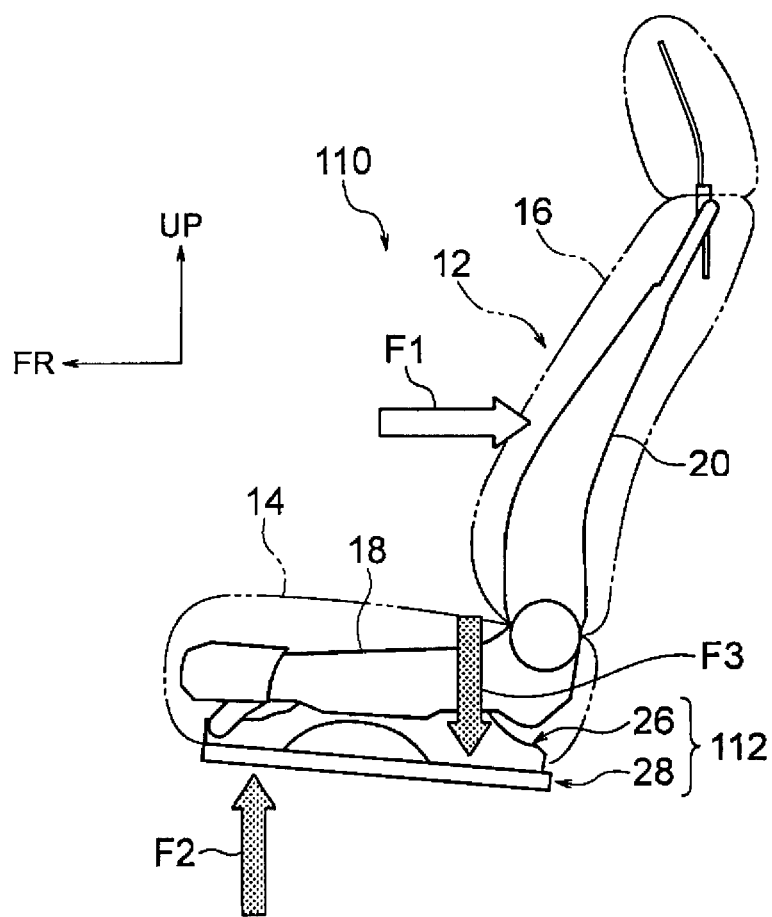
FIG. 24 is a schematic side view illustrating a configuration of relevant portions of a vehicle seat according to the second exemplary embodiment of the present invention, and is an explanatory diagram of a load input state when a vehicle is involved in a collision from behind.

In the vehicle seat 110 according to the second exemplary embodiment, when the vehicle is involved in a collision from behind then, as shown in FIG. 24, an overload F1 is input towards the vehicle rear with respect to the seat back 16 of the seat body 12 from force due to inertia of a seated occupant. In such a situation an overload F2 is input upwards to the front end portion side of the upper rail 26. When the front end portion side of the upper rail body 38 bows upwards due to the load F2, as shown in FIG. 25A, the projection portion 114 provided to the front end portion of the top wall 30A of the lower rail body 30 makes contact with the top face of the upper rail body 38. Bowing of the front end portion side of the upper rail body 38 is accordingly suppressed (see the intermittent line of FIG. 26).

In such a situation the rear end portion side of the upper rail 26 is also, as shown in FIG. 24, input with a large downwards load F3. The rear end portion side of the upper rail body 38 is bowed towards the bottom side by the load F3, and the projection portion 116 provided to the rear end portion of the bottom wall 30B of the lower rail body 30 makes contact with the bottom face of the upper rail body 38. The rear end portion side of the upper rail body 38 is accordingly suppressed from bowing (see the intermittent line of FIG. 26).

The vehicle seat 110 according to the second exemplary embodiment is accordingly capable of suppressing bowing of the upper rail 26 when involved in a collision from behind (when a large load is input), and support rigidity (strength requirement) of the seat body 12 can thereby be secured during a collision from behind. Similarly to the slide rail 22 according to the first exemplary embodiment, the supporting rigidity during normal operation of the seat body 12 can be lowered by narrowing the separation between the front and rear pair of slide guides 42, 44. Accordingly, in the vehicle seat 110 the NV performance is raised and also strength requirements during a collision from behind can also be addressed.

Figure 27A:
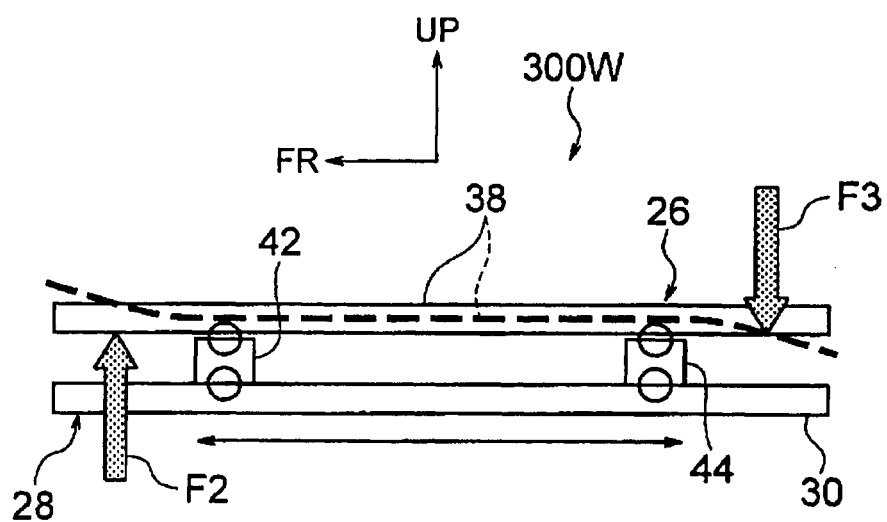
FIG. 27A is a schematic diagram for explaining a state in which the upper rail of a related slide rail has bowed.
Figure 27B:
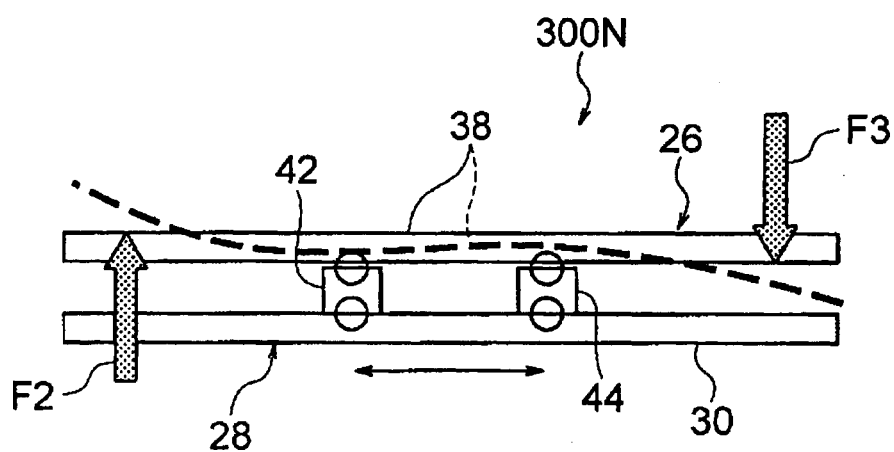
FIG. 27B is a schematic diagram for explaining a case in which the slide guide separation of the slide rail illustrated in FIG. 27A has been narrowed and the upper rail is in a bowed state.

Namely, in a related slide rail 300W as shown in FIG. 27A, the NV performance can be raised by narrowing the separation between a pair of slide guides 42, 44, such as in the slide rail 300N illustrated in FIG. 27B. However, in such a case the bowing deformation amount of the upper rail 26 during a collision from behind becomes large, as shown by the intermittent line in FIG. 27A and FIG. 27B, with the load imparted before the upper rail 26 makes contact with the lower rail 28 getting smaller. This accordingly contradicts strength requirements during a collision from behind.

Figure 28:
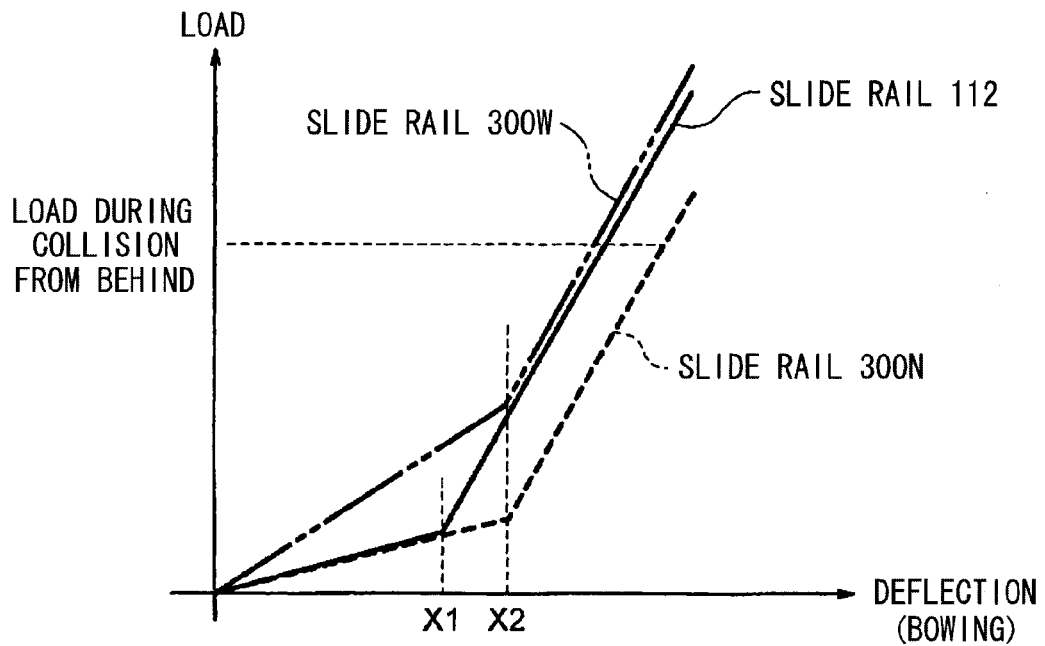
FIG. 28 is a graph illustrating characteristics of load against bowing for a slide rail according to the second exemplary embodiment of the present invention and related slide rails.

Regarding this perspective, the slide rail 112 according to the second exemplary embodiment can secure the strength requirements during a collision from behind as described above. FIG. 28 is a graph illustrating a relationship between the input load to the upper rail 26 during a collision from behind and the deflection (bowing) of the upper rail 26. In FIG. 28, the deflection of the upper rail 26 until the upper rail 26 of the slide rail 112 makes contact with the projection portions 114, 116 is indicated by X1, the deflection of the upper rail 26 of the slide rail 300W and the slide rail 300N (NV designed structure) until making contact with the lower rail 28 is indicated by X2. It can be seen from FIG. 28 that in the slide rail 300N, the deflection of the upper rail 26 during collision from behind is large, with this being detrimental to strength requirements. It can also be seen from FIG. 28 that the slide rail 112 has a small amount of deflection of the upper rail 26 during a collision from behind, and a similar load is generated to that of the slide rail 300W (having a wide spacing between the slide guides 42, 44).

Namely, the invention implemented by the slide rail 112 according to the second exemplary embodiment addresses the "non-linearity of load against bowing characteristics" like those shown in FIG. 28. Accordingly, both improvement of NV performance and strength requirements during a collision from behind, which are contradicting objectives, can be solved using an extremely simple configuration.

Figure 29:
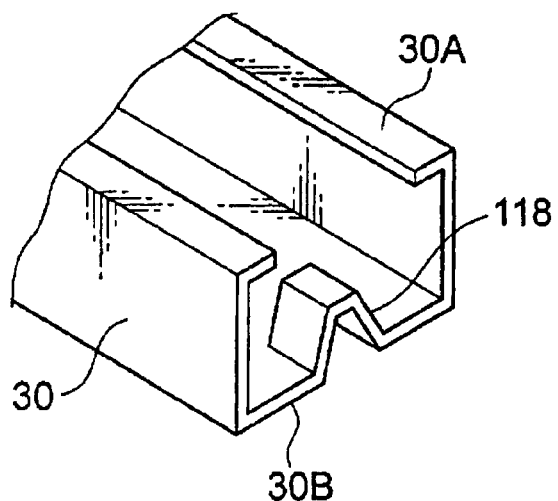
FIG. 29 is a perspective view illustrating a first modified example of a projection portion according to the second exemplary embodiment of the present invention.
Figure 30:
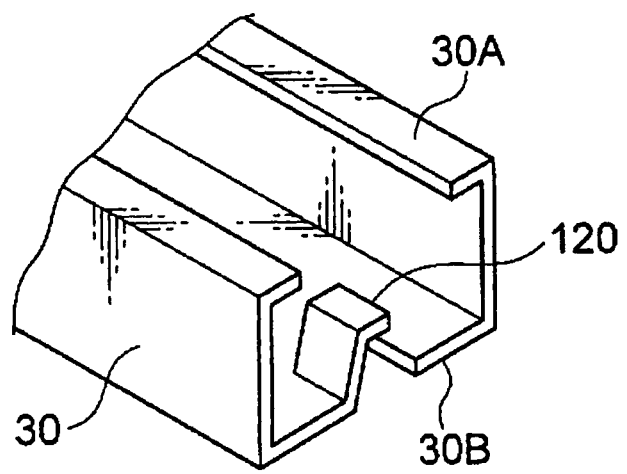
FIG. 30 is a perspective view illustrating a second modified example of a projection portion according to the second exemplary embodiment of the present invention.
Figure 31:
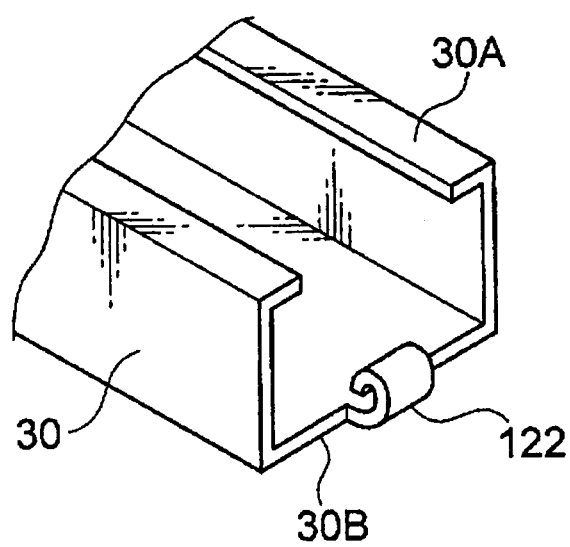
FIG. 31 is a perspective view illustrating a third modified example of a projection portion according to the second exemplary embodiment of the present invention.
Figure 32:
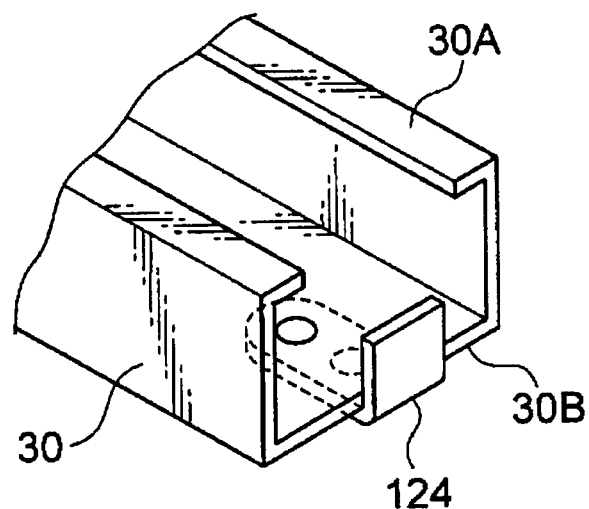
FIG. 32 is a perspective view illustrating a fourth modified example of a projection portion according to the second exemplary embodiment of the present invention.
Figure 33:
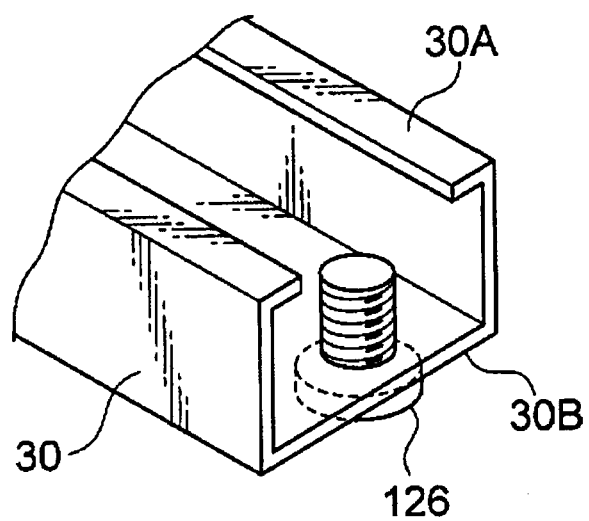
FIG. 33 is a perspective view illustrating a fifth modified example of a projection portion according to the second exemplary embodiment of the present invention.
Figure 34:
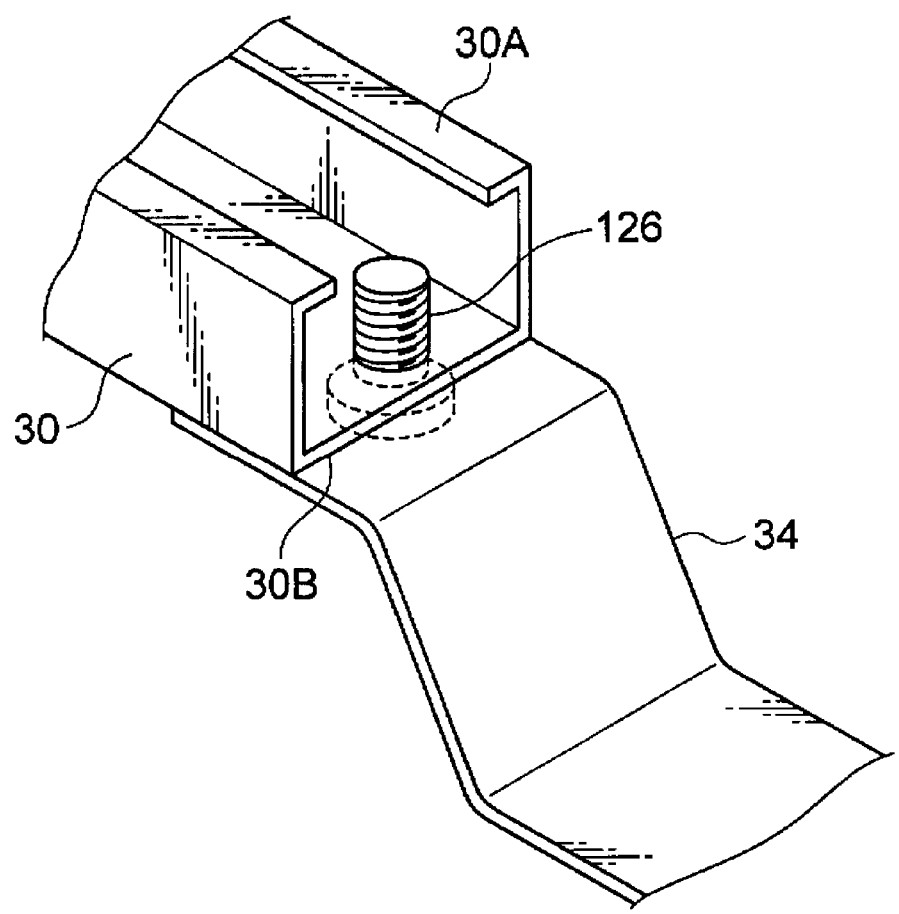
FIG. 34 is a perspective view illustrating a sixth modified example of a projection portion according to the second exemplary embodiment of the present invention.

Configuration is made in the second exemplary embodiment with the projection portion 116 formed in a block shape fixed by welding to the rear end portion of the bottom wall 30B of the lower rail body 30, however the present exemplary embodiment is not limited thereto. For example, as shown in FIG. 29 to FIG. 31, a bulging portion 118, a claw portion 120 and a folded over portion 122 may be formed and employed as a projection portion at the rear end portion of the bottom wall 30B of the lower rail body 30. As shown in FIG. 32, configuration may also be made with an L-shaped fitting 124 fixed to a rear end portion of the bottom wall 30B employed as a projection portion. As shown in FIG. 33, configuration may also be made with a screwed-in bolt 126 at the rear end portion of the bottom wall 30B employed as a projection portion. A bolt used for fastening the lower rail body 30 to the bracket 34, can, for example be employed as the bolt 126, as shown in FIG. 34.

Figure 35:
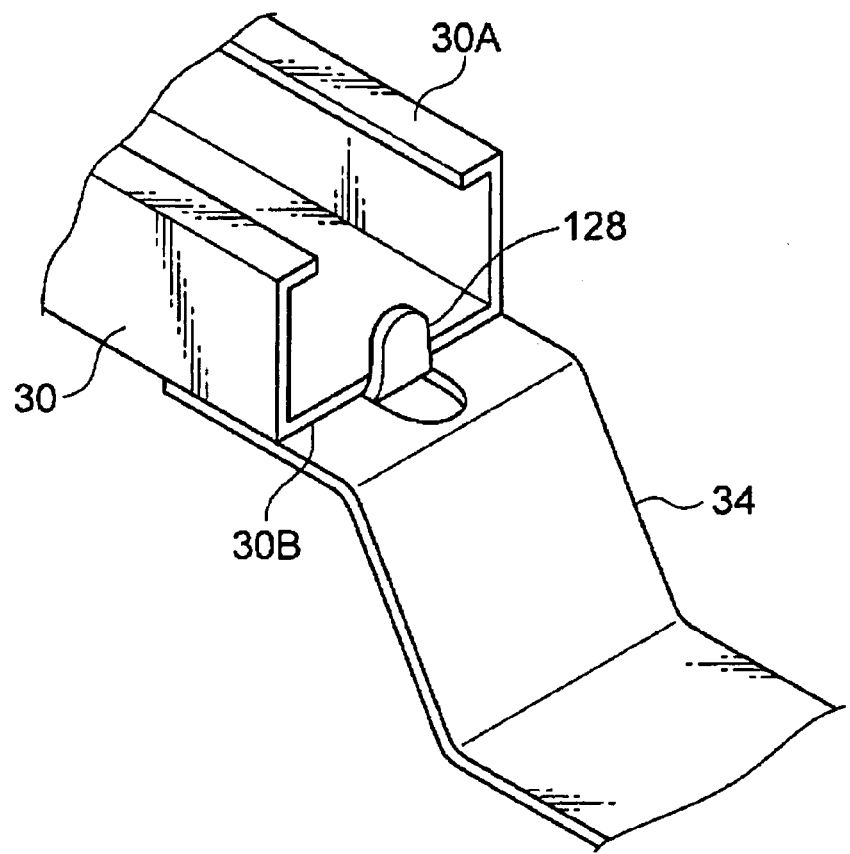
FIG. 35 is a perspective view illustrating a seventh modified example of a projection portion according to the second exemplary embodiment of the present invention.

As shown in FIG. 35, a projection portion 128 may be formed by cutting around and projecting out a portion of the bracket 34. In such cases, the projection portion 128 can also be employed for length direction positioning of the lower rail body 30 when assembling together the bracket 34 and the lower rail body 30. Since the load input from the upper rail body 38 can directly supported by the bracket 34 (on the vehicle body side), a high rigidity can be secured and also the lower rail body 30 can be prevented from breaking or deforming due to the load input to the lower rail body 30. Furthermore, an increase in cost or weight can be avoided due to the configuration utilizing previously present components.

Third Exemplary Embodiment

Figure 36:
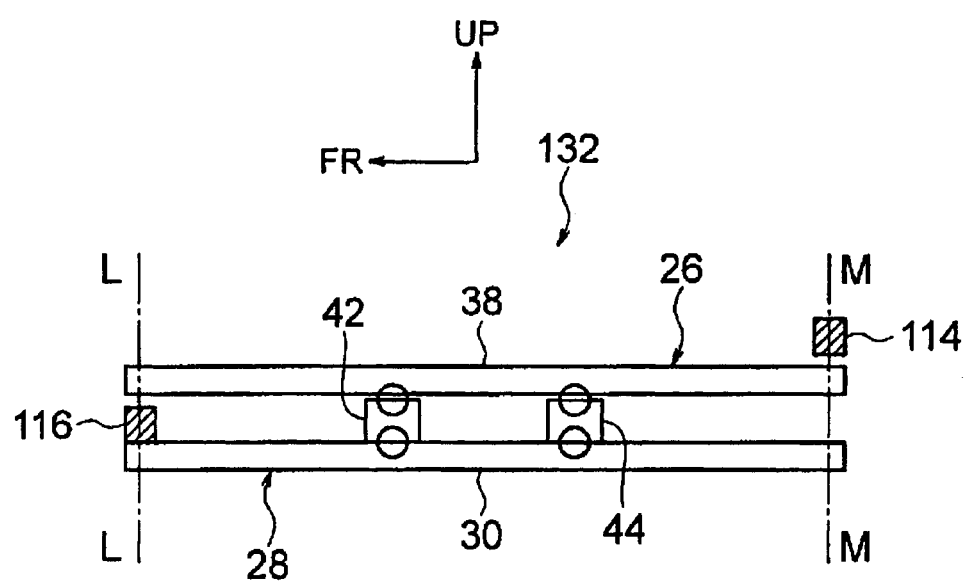
FIG. 36 is a schematic diagram of a slide rail that is a configuration member of a vehicle seat according to a third exemplary embodiment of the present invention.
Figure 37A:
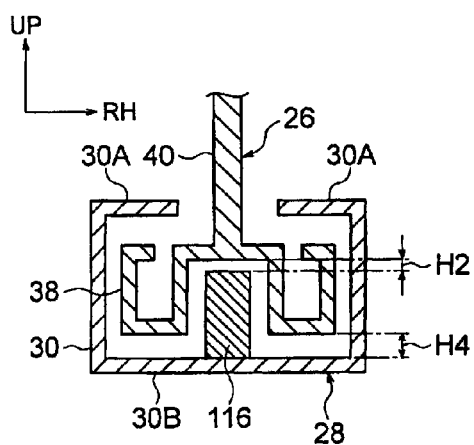
FIG. 37A is a vertical cross-section corresponding to line L-L in FIG. 36.
Figure 37B:
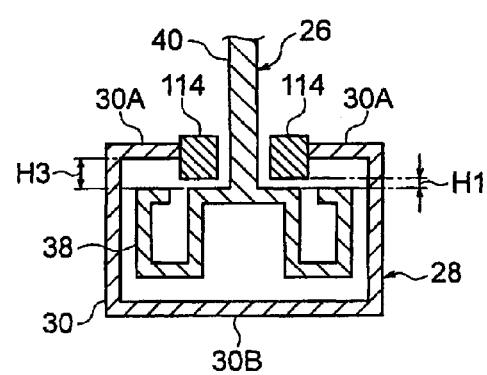
FIG. 37B is a vertical cross-section corresponding to line M-M in FIG. 36.
Figure 38:
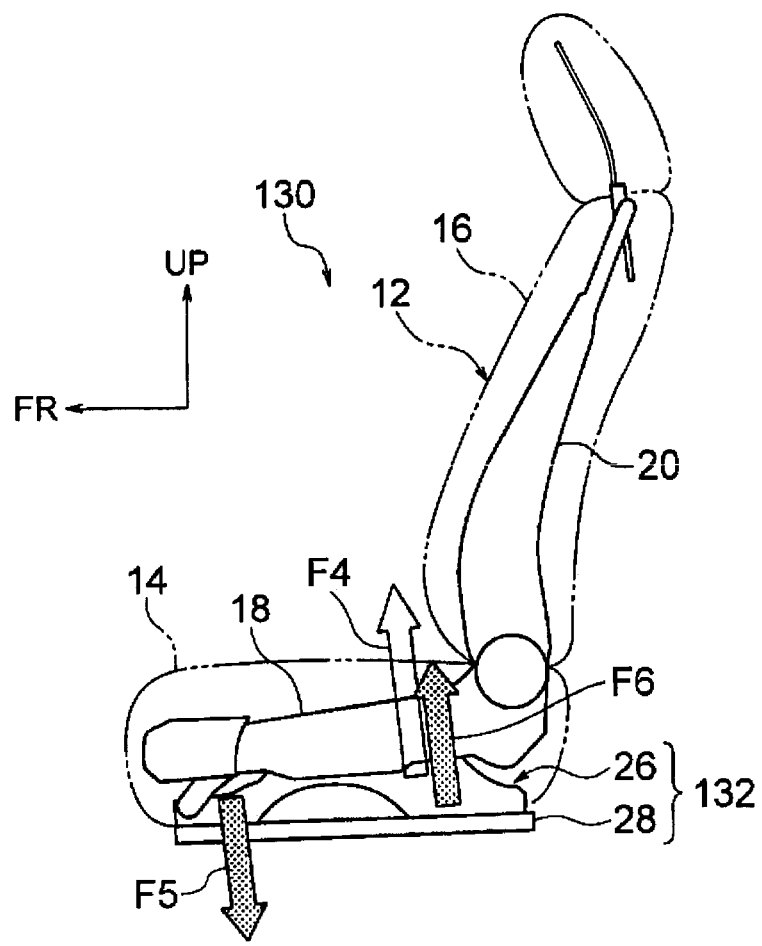
FIG. 38 is a schematic side view illustrating a configuration of relevant portions of a vehicle seat according to the third exemplary embodiment of the present invention, and is an explanatory diagram of a load input state when a vehicle is involved in a frontal collision.

FIG. 36 is a schematic diagram of a slide rail 132 that is a configuration member of a vehicle seat 130 according to a third exemplary embodiment of the present invention (see FIG. 38). FIG. 37A is a vertical cross-section corresponding to line L-L in FIG. 36, and FIG. 37B is a vertical cross-section corresponding to line M-M in FIG. 36.

The slide rail 132 is configured basically the same as the seat body 12 according to the second exemplary embodiment, however the placements of a projection portion 114 and a projection portion 116 have been front-rear reversed.

Figure 39A:
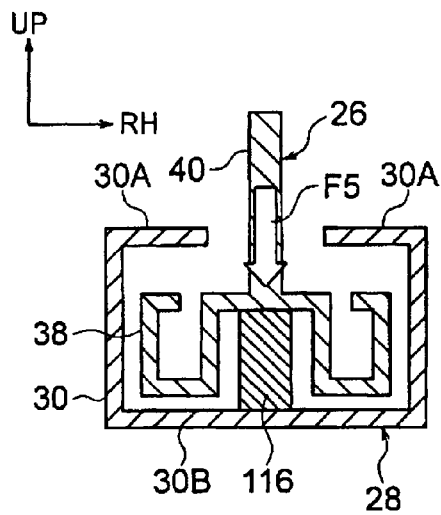
FIG. 39A is vertical cross-section corresponding to FIG. 37A, illustrating a state in which the bottom face of the upper rail has made contact with a projection portion on the lower rail front end portion.
Figure 39B:
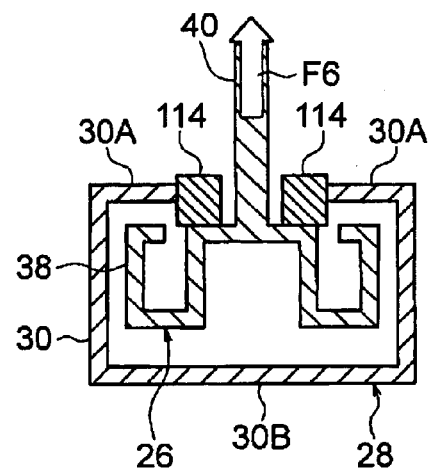
FIG. 39B is a vertical cross-section corresponding to FIG. 37B, illustrating a state in which the top face of the upper rail has made contact with projection portions of the lower rail rear end portion.

In the vehicle seat 130 according to the present exemplary embodiment, force due to inertia of a seated occupant during a vehicle frontal impact is input to a belt anchor (not shown in the drawings), resulting in an overload F4 input upwards in the vehicle to the seat body 12, as shown in FIG. 38. When this occurs, an overload F5 is input downwards to the front end portion side of the upper rail 26. When the front end portion side of the upper rail body 38 bows downwards due to the load F5, as shown in FIG. 39A, the projection portion 116 provided to the front end portion of the bottom wall 30B of the lower rail body 30 makes contact with the bottom face of the upper rail body 38. Bowing of the front end portion side of the upper rail body 38 is thereby suppressed.

When this occurs, an overload F6 is input upwards to the rear end portion side of the upper rail 26, as shown in FIG. 38. When the rear end portion side of the upper rail body 38 bows upwards due to the load F6, the projection portion 114 provided at the rear end portion of the top wall 30A of the lower rail body 30 makes contact with the top face of the upper rail body 38. Bowing of the rear end portion side of the upper rail body 38 is accordingly suppressed.

The vehicle seat 130 according to the second exemplary embodiment is accordingly capable of suppressing the upper rail 26 from bowing during a frontal impact, and supporting rigidity (strength requirements) of the seat body 12 during a frontal impact can accordingly be secured. Similarly to the slide rail 22 according to the first exemplary embodiment, the supporting rigidity to the seat body 12 in normal operation is lowered by making the separation between the front and rear pair of slide guides 42, 44 narrower.

Figure 40:
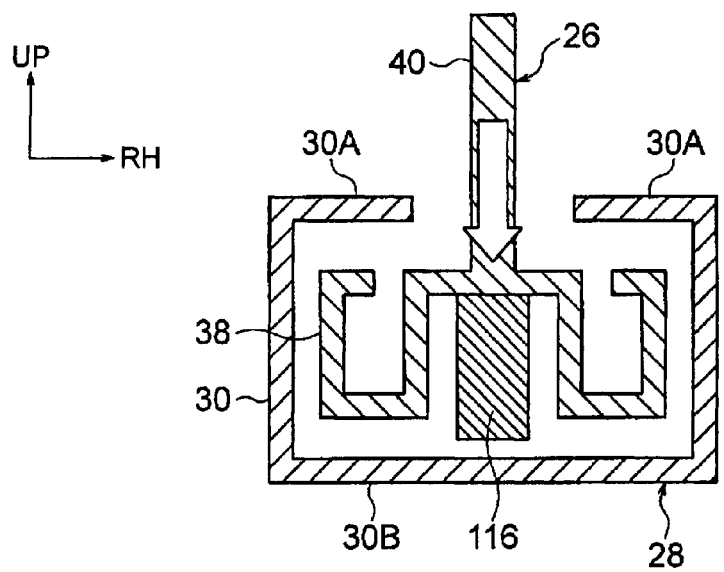
FIG. 40 is a vertical cross-section illustrating a modified example of an attachment position of a projection portion according to the second exemplary embodiment and the third exemplary embodiment of the present invention.

In the second exemplary embodiment and the third exemplary embodiment, configuration is made such that the projection portion 116 is fixed to the top face of the bottom wall 30B of the lower rail body 30, however there is no limitation thereto. Configuration may be made, as shown in FIG. 40, with the projection portion 116 fixed to the bottom face of the upper rail body 38.

Figure 41:
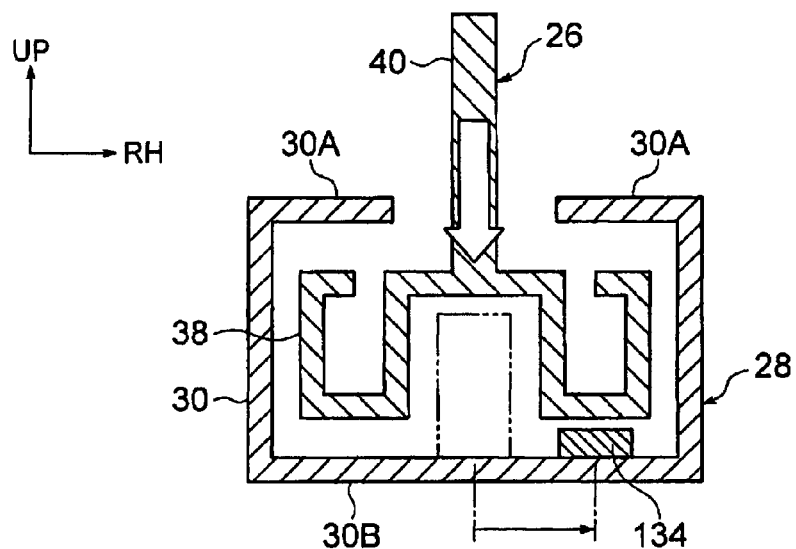
FIG. 41 is a vertical cross-section illustrating another modified example of an attachment position of the projection portion according to the second exemplary embodiment and the third exemplary embodiment of the present invention.

The upper rail body 38 is formed with a substantially W-shaped cross-section, with the seat left-right direction end sides of the bottom face of the upper rail body 38 disposed closer to the bottom wall 30B of the lower rail body 30 than a seat left-right direction central portion of the bottom face of the upper rail body 38. Accordingly, as shown in FIG. 41, configuration may be made with a projection portion 134 provided between a seat left-right direction end side of the bottom face of the upper rail body 38 and the bottom wall 30B of the lower rail body 30. In such cases the projection portion can be made more compact and lighter in weight since the height dimension of the projection portion can be lowered.

Fourth Exemplary Embodiment

Figure 42:
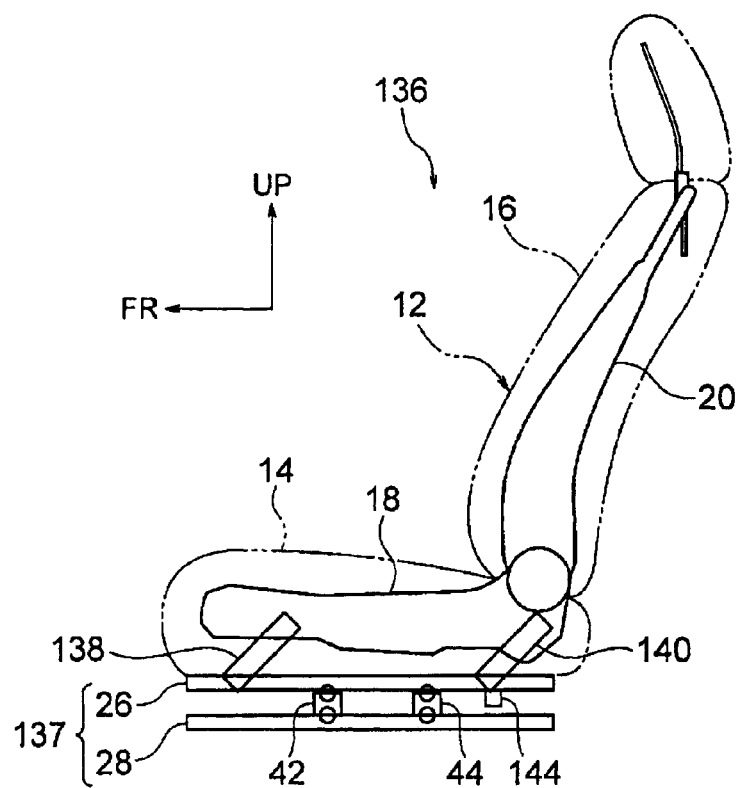
FIG. 42 is a schematic diagram illustrating a configuration of relevant portions of a vehicle seat according to the fourth exemplary embodiment of the present invention.
Figure 43:
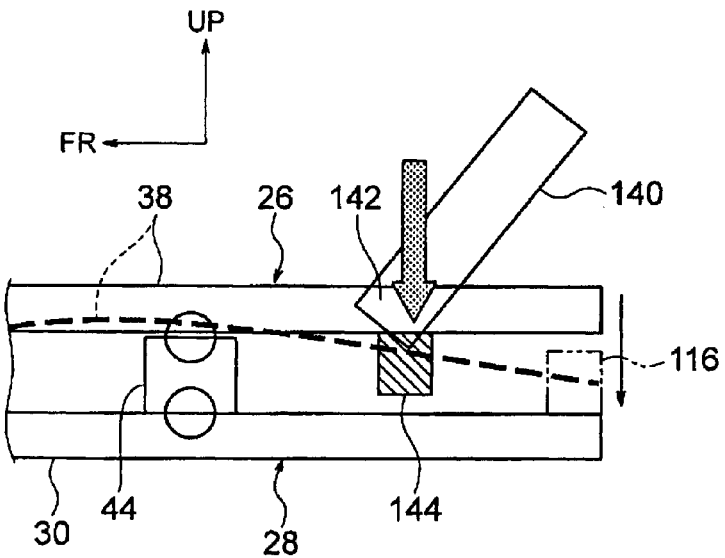
FIG. 43 is an enlarged diagram of a portion of FIG. 42.

FIG. 42 is a schematic diagram of a configuration of a vehicle seat 136 according to a fourth exemplary embodiment of the present invention. FIG. 43 is a schematic diagram illustrating a portion of a slide rail 137 of the vehicle seat 136. In the vehicle seat 136 the seat body 12 is equipped with a lifter for adjusting the seating plane height of the seat cushion 14, and a seat cushion frame 18 is coupled to a upper rail 26 through a front side link member 138 and a rear side link member 140. A block shaped projection portion 144 is provided below a coupling section 142 of the rear side link member 140 and the upper rail 26 (coupling section of the seat body 12 and the upper rail 26). The projection portion 144 is fixed by welding to the bottom face of the upper rail body 38, so as to face a bottom wall 30B (not shown in FIG. 43) of the lower rail body 30 with a specific gap separation thereto.

In the present exemplary embodiment, when the rear end side of the upper rail body 38 bows downwards, bowing of the upper rail body 38 is suppressed by the projection portion 144 making contact with the bottom wall 30B of the lower rail body 30.

Figure 44:
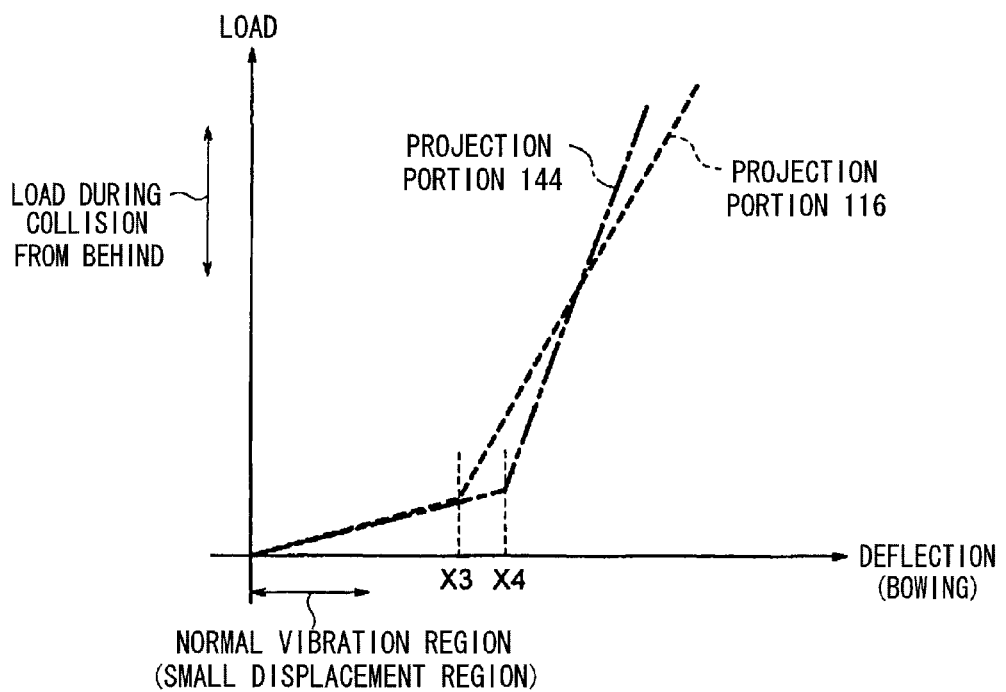
FIG. 44 is a graph illustrating characteristics of load against bowing for slide rails according to the second exemplary embodiment and the fourth exemplary embodiment of the present invention.

FIG. 44 is a graph illustrating a comparison of load against bowing characteristics for a case when the projection portion 144 is provided below the coupling section 142 (the present exemplary embodiment) and when the projection portion 116 is provided to the rear end portion of the lower rail body 30 as in the second exemplary embodiment. It can be seen from FIG. 44 that when the projection portion 116 is provided, bowing of the upper rail body 38 can be suppressed at an earlier stage to when the projection portion 144 is provided (see X3 and X4 in FIG. 44). However, when the projection portion 144 is provided the rise in load from suppressing bowing of the upper rail body 38 rises more rapidly than when the projection portion 116 is provided, resulting in high rigidity.

Namely, in the present exemplary embodiment, when the projection portion 144 is provided below the coupling section 142 (or the vicinity of below), since the coupling section 142 can be given direct support to the seat body 12 without being influenced by deformation of the upper rail body 38, excellent supporting rigidity to the seat body 12 is achieved.

Fifth Exemplary Embodiment

Figure 45:
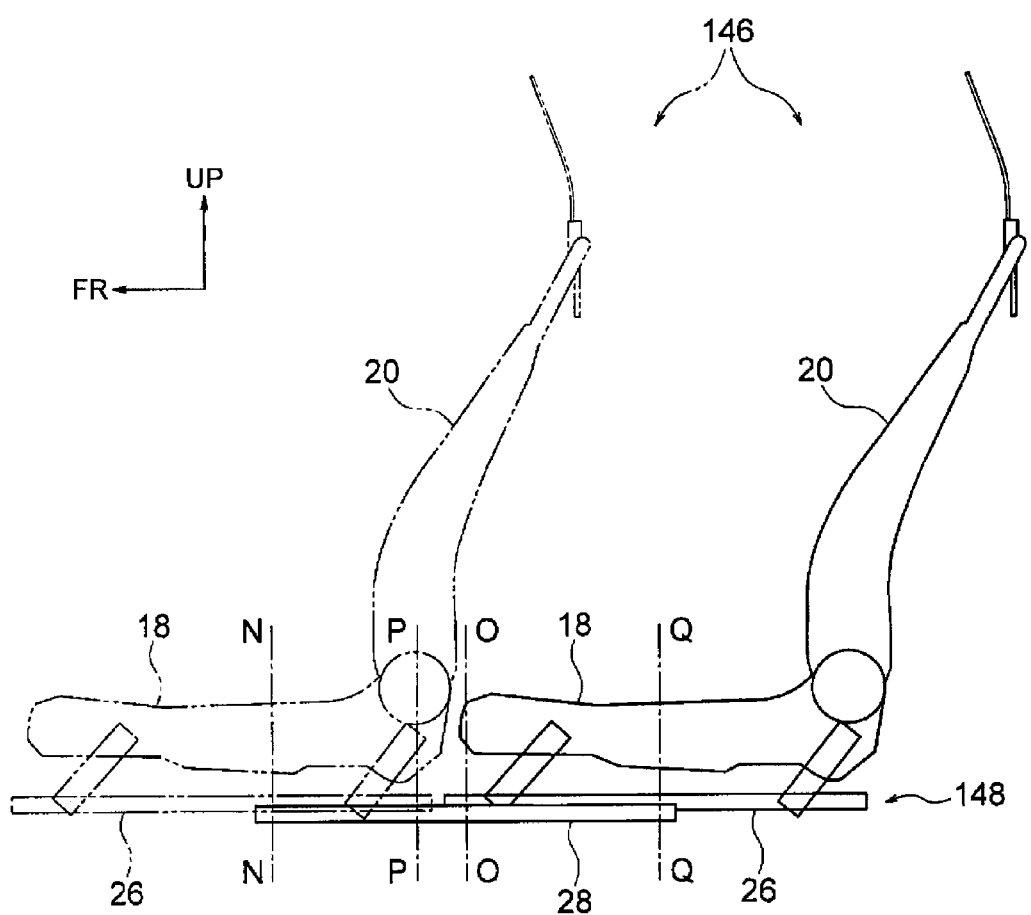
FIG. 45 is a schematic diagram illustrating a configuration of relevant portions of the vehicle seat according to the fifth exemplary embodiment of the present invention.
Figure 46A:
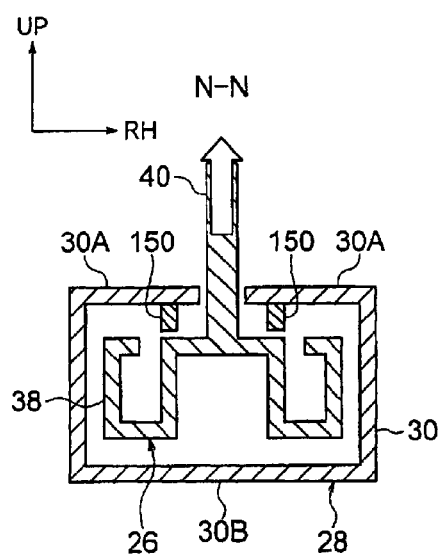
FIG. 46A corresponds to a vertical cross-section taken on line N-N in FIG. 45, FIG. 46B corresponds to a vertical cross-section taken on line O-O in FIG. 45, FIG. 46C corresponds to a vertical cross-section taken on line P-P in FIG. 45, and FIG. 46D corresponds to a vertical cross-section taken on line Q-Q in FIG. 45.
Figure 46B:
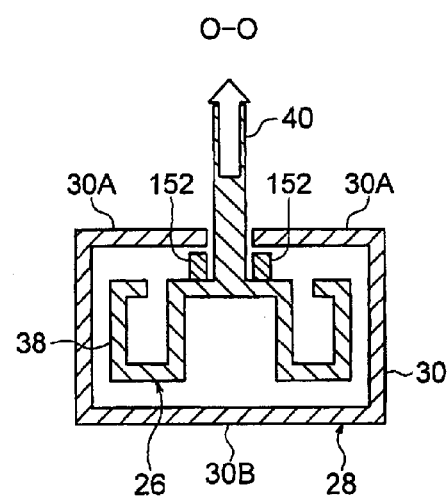
Figure 46C:
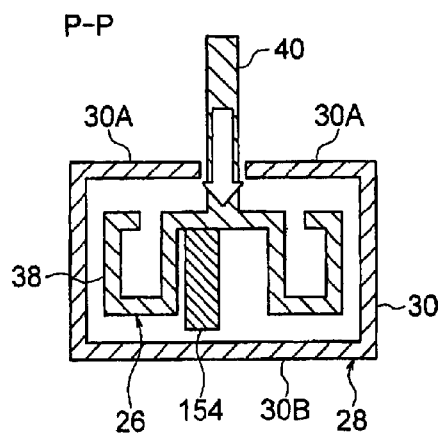
Figure 46D:
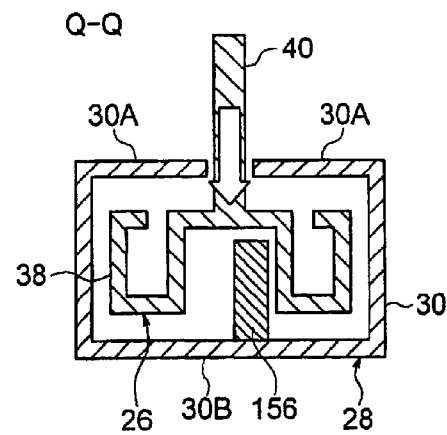

FIG. 45 is a schematic diagram illustrating a configuration of relevant portions of a vehicle seat 146 according to a fifth exemplary embodiment of the present invention. FIG. 46A is a vertical cross-section corresponding to line N-N of FIG. 45. FIG. 46B is a vertical cross-section corresponding to line O-O of FIG. 45. FIG. 46C is a vertical cross-section corresponding to line P-P of FIG. 45. FIG. 46D is a vertical cross-section corresponding to line Q-Q of FIG. 45.

In a slide rail 148 of the vehicle seat 146, as shown in FIG. 46A, a left and right pair of projection portions 150 are fixed to the bottom face of the front end portion of the top wall 30A of the lower rail body 30. As shown in FIG. 46B, a left and right pair of projection portions 152 are provided to the top face of the front end portion of the upper rail body 38. Furthermore, a projection portion 154 is fixed to the bottom face of the rear end portion of the upper rail body 38, and as shown in FIG. 46D, a projection portion 156 is fixed to the top face of the rear end portion of the bottom wall 30B of the upper rail body 38.

In the present exemplary embodiment, when a vehicle has been involved in a collision from behind in a state in which the upper rail 26 is slid towards the seat rear side with respect to the lower rail 28, as shown by the solid lines in FIG. 45, bowing of the upper rail body 38 is suppressed by the projection portions 152 making contact with the top wall 30A of the lower rail body 30 and the projection portion 156 making contact with the bottom face of the upper rail body 38.

As shown by the double-dot intermittent lines of FIG. 45, when a vehicle has been involved in a collision from behind in a state in which the upper rail 26 is slid towards the seat front side with respect to the lower rail 28, bowing of the upper rail body 38 is suppressed by the projection portions 150 making contact with the top face of the upper rail body 38 and the projection portion 156 making contact with the bottom face of the lower rail body 30.

In this manner, in the present exemplary embodiment, bowing of the upper rail body 38 can be suppressed from occurring during a collision from behind irrespective of the sliding state of the upper rail 26.

In a case in which the front and rear placements of the upper rail 26 and the lower rail 28 are reversed, bowing of the upper rail body 38 can be suppressed from occurring during a frontal collision irrespective of the sliding state of the upper rail 26.

In the second exemplary embodiment to the fifth exemplary embodiment, the front lower projection portion 50, the rear lower projection portion 60, the front upper projection portion 52 and the rear upper projection portion 58 according to the first exemplary embodiment have been omitted in the illustrations for ease of explanation. However the invention as implemented by the first exemplary embodiment and the invention as implemented by the second to the fifth exemplary embodiments can both be applied to the same vehicle seat at the same time. For example, it is possible to employ the projection portion 116 illustrated in FIG. 22 or FIG. 36 in common with (as the same component) the front lower projection portion 50 or the rear lower projection portion 60 illustrated in FIG. 2, or it is possible to employ separate members therefore by implementing slight changes to the profile and/or slight changes to the placement.

The invention claimed is:

1. A vehicle seat supported such that an upper rail connected to a seat body is capable of sliding in a seat front-rear direction relative to a lower rail fixed at a vehicle body side through a pair of slide guides disposed in a row along the seat front-rear direction, wherein:
   a separation between a seat front-rear direction central portion of a first of the slide guides and the seat front-rear direction central portion of the second of the slide guides is narrower than half of a maximum slide amount of the upper rail with respect to the lower rail;
   at least one of the upper rail or the lower rail comprises at least one projection portion projecting out towards the opposing rail side in the vehicle up-down direction at the front end portion or the rear end portion or both the front and rear end portions;
   a gap is provided between a leading end of the at least one projection portion and the opposing rail such that the gap has a smaller up-down direction dimension than the up-down direction dimension of the at least one projection portion; and
   the leading end of the at least one projection portion suppresses bowing by making contact with the opposing rail when the upper rail bows towards the lower rail side due to load applied from a seat body side, and wherein:
   the upper rail comprises a front upper projection portion and a rear upper projection portion disposed further to the seat rear side than the front upper projection portion;
   the lower rail comprises a front lower projection portion and a rear lower projection portion disposed further to the seat rear side than the front lower projection portion;
   each of the pair of slide guides comprises a guide body and a ball rotatably attached to the guide body;
   the upper rail is restricted from sliding towards the seat front side with respect to the lower rail by the guide body of the first slide guide, which is disposed at the center between the rear upper projection portion and the front lower projection portion in a state in which the upper rail is disposed at the center of its sliding range with respect to the lower rail, being sandwiched between the rear upper projection portion and the front lower projection portion;
   the upper rail is restricted from sliding towards the seat rear side with respect to the lower rail by the guide body of the second slide guide, which is disposed at the center between the front upper projection portion and the rear lower projection portion in a state in which the upper rail is disposed at the center of the sliding range with respect to the lower rail, being sandwiched between the front upper projection portion and the rear lower projection portion, and
   the at least one projection portion is structured by at least one of the front lower projection portion or the rear lower projection portion.

2. The vehicle seat of claim 1, wherein:
   a first side contact portion that makes contact with the rear upper projection portion and the front lower projection portion is provided to the guide body of the first slide guide, and a second side contact portion that makes contact with the front upper projection portion and the rear lower projection portion is provided to the guide body of the second slide guide;
   the rear upper projection portion, the front lower projection portion and the first side contact portion are disposed further to a first side in the seat left-right direction than seat left-right direction central portions of the upper rail and the lower rail; and
   the front upper projection portion, the rear lower projection portion and the second side contact portion are disposed further to the second side in the seat left-right direction than seat left-right direction central portions of the upper rail and the lower rail.

3. The vehicle seat of claim 1 wherein: the front lower projection portion is provided to a front end portion of the lower rail, the rear lower projection portion is provided to a rear end portion of the lower rail, and the upper rail is restricted from sliding towards the seat front side with respect to the lower rail by the guide body of the slide guide at the seat front side being sandwiched between the rear upper projection portion and the front lower projection portion; and the upper rail is restricted from sliding towards the seat rear side with respect to the lower rail by the guide body of the slide guide on the seat rear side being sandwiched between the front upper projection portion and the rear lower projection portion.

4. The vehicle seat of claim 1, wherein: the lower rail comprises a top wall whose bottom face faces towards the top face of the upper rail and a bottom wall whose top face faces towards the bottom face of the upper rail; the at least one projection portion is provided to at least one of the top face side of the front end portion of the upper rail or the bottom face side of the front end portion of the top wall; and the at least one projection portion is provided to at least one of the bottom face side of the rear end portion of the upper rail or the top face side of the rear end portion of the bottom wall.

5. The vehicle seat of claim 1, wherein: the lower rail comprises a top wall whose bottom face faces towards the top face of the upper rail and a bottom wall whose top face faces towards the bottom face of the upper rail; the at least one projection portion is provided to at least one of the bottom face side of the front end portion of the upper rail or the top face side of the front end portion of the bottom wall; and the at least one projection portion is provided to at least one of the top face side of the rear end portion of the upper rail or the bottom face side of the rear end portion of the top wall.

6. The vehicle seat of claim 1, wherein: the seat left-right direction end sides of the bottom face of the upper rail are disposed closer to the lower rail than the seat left-right direction central portion of the bottom face of the upper rail; and the at least one projection portion is provided between the seat left-right direction end sides of the bottom face of the upper rail and the lower rail.

7. The vehicle seat of claim 1, wherein: the lower rail comprises a rail body and at least one bracket for connecting the seat front-rear direction end portions of the rail body to the vehicle body; and the at least one projection portion is provided to the at least one bracket.

8. The vehicle seat of claim 1, wherein the projection portion projects from the upper rail in the vicinity of below a connection portion to the seat body towards the lower rail side.

9. The vehicle seat of claim 1, wherein a bent portion is provided to the projection portion.

10. The vehicle seat of claim 9, wherein a gap is provided between at least one of the upper rail and the lower rail and the leading end of the at least one projection portion.

* * * * *